US011565973B2

(12) United States Patent
Wagh

(10) Patent No.: US 11,565,973 B2
(45) Date of Patent: Jan. 31, 2023

(54) SPRAYABLE SILICATE-BASED COATINGS AND METHODS FOR MAKING AND APPLYING SAME

(71) Applicant: Ceramicoat International Limited, London (GB)

(72) Inventor: Arun S. Wagh, Oakbrook Terrace, IL (US)

(73) Assignee: Ceramicoat International Limited

( * ) Notice: Subject to any disclaimer, the term of this patent is extended or adjusted under 35 U.S.C. 154(b) by 177 days.

(21) Appl. No.: 16/795,094

(22) Filed: Feb. 19, 2020

(65) Prior Publication Data

US 2020/0189975 A1 Jun. 18, 2020

Related U.S. Application Data

(63) Continuation-in-part of application No. 15/530,920, filed on Mar. 24, 2017, now abandoned.

(60) Provisional application No. 62/390,650, filed on Apr. 6, 2016.

(51) Int. Cl.
| C04B 28/34 | (2006.01) |
| C04B 14/22 | (2006.01) |
| C04B 14/42 | (2006.01) |
| C04B 14/10 | (2006.01) |
| C04B 24/38 | (2006.01) |
| C03C 10/00 | (2006.01) |
| C03C 10/16 | (2006.01) |
| C03C 12/00 | (2006.01) |
| C04B 111/00 | (2006.01) |

(52) U.S. Cl.
CPC ........ C04B 28/348 (2013.01); C03C 10/0027 (2013.01); C03C 10/0054 (2013.01); C03C 10/16 (2013.01); C03C 12/00 (2013.01); C04B 14/106 (2013.01); C04B 14/22 (2013.01); C04B 14/42 (2013.01); C04B 24/383 (2013.01); C03C 2204/00 (2013.01); C04B 2111/00482 (2013.01)

(58) Field of Classification Search
CPC ..... C04B 28/348; C04B 28/346; C04B 14/22; C04B 14/42; C04B 2111/00482; C04B 2111/00525; C04B 2111/26; C04B 2111/28; C03C 8/14; C03C 8/02
See application file for complete search history.

(56) References Cited

U.S. PATENT DOCUMENTS

| 3,248,249 | A | | 4/1966 | Collins | |
| 4,772,436 | A | | 9/1988 | Tyszblat | |
| 4,775,592 | A | * | 10/1988 | Akahane | A61K 6/20 427/217 |
| 6,248,680 | B1 | | 6/2001 | Xue et al. | |
| 7,429,290 | B2 | * | 9/2008 | Lally | C09D 5/18 252/607 |
| 7,488,762 | B2 | * | 2/2009 | Takano | A61K 6/889 523/117 |
| 7,648,814 | B2 | | 1/2010 | Sasaki et al. | |
| 2004/0194657 | A1 | * | 10/2004 | Lally | A61F 2/28 252/607 |
| 2005/0229809 | A1 | * | 10/2005 | Lally | C09D 5/18 106/18.14 |
| 2007/0221270 | A1 | | 9/2007 | Watsuji et al. | |
| 2011/0143910 | A1 | | 6/2011 | Wagh et al. | |
| 2013/0190165 | A1 | | 7/2013 | Colorado et al. | |
| 2016/0258067 | A1 | * | 9/2016 | Patel | C09D 5/084 |

FOREIGN PATENT DOCUMENTS

| GB | 2180833 | 4/1987 |
| JP | S5324324 | 3/1978 |
| JP | H01239049 | 9/1989 |
| WO | 2015023660 A1 | 2/2015 |
| WO | 2018193223 | 10/2018 |
| WO | 2018193223 A2 | 10/2018 |

OTHER PUBLICATIONS

Patent Cooperation Treaty (PCT), International Search Report and Written Opinion for Application PCT/US2021/018676 filed on Feb. 19, 2021, dated Jul. 7, 2021, International Searching Authority, EP.
PCT International Search Report and Written Opinion dated Jan. 16, 2019 for PCT Application No. PCT/GB2018/000091 (published as WO 2018/193223A2).
PCT International Preliminary Report on Patentability dated Sep. 24, 2019 for PCT Application No. PCT/GB2018/000091 (published as WO 2018/193223A2).

* cited by examiner

Primary Examiner — Noah S Wiese
(74) Attorney, Agent, or Firm — McDonald Hopkins LLC

(57) ABSTRACT

The present invention relates generally to silicate-based coatings and to methods to make and apply same. In one embodiment, the silicate-coatings of the present invention are formed from a two part mixture of phosphate-based component and a glass-based component. In another embodiment, the silicate-based coatings of the present invention are free from any organic materials.

19 Claims, No Drawings

SPRAYABLE SILICATE-BASED COATINGS AND METHODS FOR MAKING AND APPLYING SAME

RELATED APPLICATION DATA

This patent application is a continuation-in-part of and claims priority to U.S. patent application Ser. No. 15/530,920, filed Mar. 24, 2017, and titled "Sprayable Alumino-Silicate Coatings, Resins, Their Compositions and Products," which itself is a non-provisional of U.S. Provisional Patent Application No. 62/390,650, filed Apr. 6, 2016. The complete texts of both of these applications are hereby incorporated by reference as though fully set forth herein in their entireties.

FIELD OF THE INVENTION

The present invention relates generally to silicate-based coatings and to methods to make and apply same. In one embodiment, the silicate-coatings of the present invention are formed from a two part mixture of phosphate-based component and a glass-based component. In another embodiment, the silicate-based coatings of the present invention are free from any organic materials.

BACKGROUND

Currently, the bulk of commercially available coating products for use in ambient conditions (i.e., typical room temperature and pressure) to protect against and/or control corrosion, for fire protection and/or for use as decorative paints, are made of organic polymer emulsions which are designed to form a physical coat over a substrate on which they are applied. As a whole, such coatings typically exhibit a smooth and pleasing appearance. However, such coatings tend to suffer from several inherent problems.

Initially, such organic polymer emulsions only form a physical coat. Accordingly, if such coatings are scratched, any underlying metal surface is exposed and is vulnerable to corrosion. Once such a coated part begins corroding, the neighboring coating tends to bubble up and peel off due to the corrosion spreading away from the exposed area. This happens even if the neighboring areas are still coated as corrosion can and does spread underneath the neighboring coated areas. This phenomenon is called osmotic blistering, which is a very common problem with organic polymer-based coatings. Additionally, such polymer coatings, or even organic-based polymer coatings, cannot be used for fire protection, unless special intumescent (i.e., a compound that expands upon exposure to high heat conditions) is utilized.

Furthermore, the vast majority, if not all, of organic polymer coatings release volatile organic compounds (VOCs) during manufacture, application and often even for a period right after application. It is well known that such VOCs are not only harmful to the ozone layer as well as the general environment, but are also harmful to anyone exposed to such VOCs. Additionally, organic polymer coatings produce harmful gases when burned and the disposal of left over coating materials can be subject to various hazardous material handling guidelines and/or regulations. Finally, since polymer coatings are made from various organic compounds, their carbon footprint is high.

Thus, there is a need in the industry for non-organic based coatings that are corrosion resistant, fire-resistant and/or more environmentally benign than the organic polymer coatings that are currently available.

SUMMARY OF THE INVENTION

The present invention relates generally to silicate-based coatings and to methods to make and apply same. In one embodiment, the silicate-coatings of the present invention are formed from a two part mixture of phosphate-based component and a glass-based component. In another embodiment, the silicate-based coatings of the present invention are free from any organic materials.

In one embodiment, the present invention comprises a silicate-based coating composition comprising: Part (A), wherein Part (A) is an acidic phosphate-based material selected from one or more of Part (A1) and/or Part (A2); and Part (B), wherein Part (B) is a glass powder/metal oxide mixture selected from one or more of Part (B1) and/or Part (B2), wherein Part (A) is combined with Part (B) at a ratio of Part (A) to Part (B) of about 1:0.5 to about 1:3, wherein Part (A1) comprises: (A1a) from about 58 percent by weight to about 78 percent by weight of at least one alkali-acid phosphate or an equivalent thereof; (A1b) from about 1 percent by weight to about 5 percent by weight of phosphoric acid or an equivalent thereof; and (A1c) from about 17 percent by weight to about 37 percent by weight of water, wherein Part (A2) comprises: (A2a) from about 5 percent by weight to about 17 percent by weight of at least one metal compound, metal oxide or an equivalent thereof; (A2b) from about 44 percent by weight to about 64 percent by weight of phosphoric acid or an equivalent thereof; and (A2c) from about 24 percent by weight to about 44 percent by weight of water, wherein Part (B1) comprises: (B1a) from about 30 percent by weight to about 50 percent by weight of at least one silica-based glass powder or equivalent thereof; (B1b) from about 12 percent by weight to about 32 percent by weight of at least one metal oxide or an equivalent thereof; and (B1c) from about 23 percent by weight to about 43 percent by weight of water, and wherein Part (B2) comprises: (B2a) from about 12 percent by weight to about 32 percent by weight of at least one silica-based glass powder or equivalent thereof; (B2b) from about 30 percent by weight to about 50 percent by weight of at least one metal oxide or an equivalent thereof; and (B2c) from about 25 percent by weight to about 45 percent by weight of water.

In another embodiment, the present invention comprises an acidic phosphate-based material comprising one or both of Part (A1) and/or Part (A2), wherein Part (A1) comprises: (A1a) from about 58 percent by weight to about 78 percent by weight of at least one alkali-acid phosphate or an equivalent thereof; (A1b) from about 1 percent by weight to about 5 percent by weight of phosphoric acid or an equivalent thereof; and (A1c) from about 17 percent by weight to about 37 percent by weight of water, and wherein Part (A2) comprises: (A2a) from about 5 percent by weight to about 17 percent by weight of at least one metal compound, metal oxide or an equivalent thereof; (A2b) from about 44 percent by weight to about 64 percent by weight of phosphoric acid or an equivalent thereof; and (A2c) from about 24 percent by weight to about 44 percent by weight of water.

In still another embodiment, the present invention comprises a glass powder/metal oxide mixture comprising one or both of Part (B1) and/or Part (B2), wherein Part (B1) comprises: (B1a) from about 30 percent by weight to about 50 percent by weight of at least one silica-based glass powder or equivalent thereof; (B1b) from about 12 percent by weight to about 32 percent by weight of at least one metal oxide or an equivalent thereof; and (B1c) from about 23 percent by weight to about 43 percent by weight of water, and wherein Part (B2) comprises: (B2a) from about 12 percent by weight to about 32 percent by weight of at least one silica-based glass powder or equivalent thereof; (B2b) from about 30 percent by weight to about 50 percent by weight of at least one metal oxide or an equivalent thereof; and (B2c) from about 25 percent by weight to about 45 percent by weight of water.

In still another embodiment, the present invention comprises a silica-based glass powder comprising: from about 23 percent by weight to about 43 percent by weight of silicon dioxide powder or an equivalent thereof; from about 23 percent by weight to about 43 percent by weight of at least one form of aluminum oxide powder; and from about 18 percent by weight to about 38 percent by weight of calcium fluoride powder; and from about 1 percent by weight to about 11 percent by weight of sodium hexafluoroaluminate powder, wherein the above components and/or their equivalents are mixed together, vitrified and then pulverized into a powder to form the silica-based glass powder.

DESCRIPTION OF THE INVENTION

As noted above, the present invention relates generally to silicate-based coatings and to methods to make and apply same. In one embodiment, the silicate-coatings of the present invention are formed from a two part mixture of phosphate-based component and a glass-based component. In another embodiment, the silicate-based coatings of the present invention are free from any organic materials.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Initially, in one embodiment, the coatings of the present invention are formed from the combination of a two part formulation where Part (A) is selected from an acidic phosphate-based material and Part (B) is a combination of a glass powder with one or more metal oxides. In another embodiment, the coatings of the present invention are formed from the combination of a two part formulation selected from Part (A1) and/or Part (A2) in combination with Part (B1) and/or Part (B2). As would be apparent, the coatings of the present invention can be formed by any combination of Part (A1) with Part (B1), Part (A2) with Part (B2), Part (A2) with Part (B1), or Part (A2) with Part (B2) as will be detailed below. The details regarding the specific formations of Parts (A1), (A2), (B1) and (B2) will also be described in detail below.

In general, both Part (A1) and Part (A2) are acidic in nature and have pH values below about 5, below about 4.5, below about 4, below about 3.5, or even about 3. In general, both Part (B1) and (B2) are alkali in nature and have pH values above about 7.5, above about 8, above about 8.5, or even about 9. In still another instance, both Part (B1) and Part (B2) can be formed to have a essentially neutral pH of between about 6.5 and 7.5.

Part (A1)

Regarding Part (A1), Part (A1) is in one embodiment formed from a combination of: (A1a) at least one alkali-acid phosphate (e.g., $LiH_2PO_4$, $NaH_2PO_4$ and/or $KH_2PO_4$) or an equivalent thereof; (A1b) phosphoric acid ($H_3PO_4$) or an equivalent thereof; and (A1c) water. In another embodiment, a combination of alkali phosphates can be utilized in combination with component (A1a) or even in place of component (A1a)—the at least one alkali-acid phosphate—so long as the compound in question has at least one acid-phosphate therein. In this embodiment, suitable alkali phosphates and/or alkali-acid phosphates include, but are not limited to, monolithium phosphate ($LiH_2PO_4$), dilithium phosphate ($Li_2H_2PO_4$), monopotassium phosphate ($KH_2PO_4$), dipotassium phosphate ($K_2HPO_4$), monosodium phosphate ($NaH_2PO_4$), disodium phosphate ($Na_2HPO_4$), monosodium diphosphate ($NaH_3P_2O_7$), disodium diphosphate ($Na_2H_2P_2O_7$), trisodium diphosphate ($Na_3HP_2O_7$), tetrasodium diphosphate ($Na_4P_2O_7$), or mixtures of any two or more, three or more, four or more, or even five or more thereof. Although the above phosphate compounds are shown solely as anhydrous compounds they are not restricted to such. Rather, any hydrated forms of such compounds are also covered thereby regardless of the number of bound water molecules contained in their hydrated forms.

In another embodiment, component (A1b) of Part (A1)—the phosphoric acid ($H_3PO_4$)—can be replaced by a mixture of one or more other phosphoric acids or phosphoric acid anhydrides including, but not limited to, one or more of orthophosphoric acid ($H_3PO_4$) (also referred to herein as just phosphoric acid), pyrophosphoric acid ($H_4P_2O_7$), tripolyphosphoric acid ($H_5P_3O_{10}$), tetrapolyphosphoric acid ($H_6P_4O_{13}$), trimetaphosphoric acid ($H_3P_3O_9$), phosphoric anhydride ($P_4O_{10}$) and/or pyrophosphoric acid ($H_4P_2O_7$). In another embodiment, component (A1b) of Part (A1)—the phosphoric acid ($H_3PO_4$)—can be replaced by a mixture of two or more of the above phosphoric acids or phosphoric anhydrides, three or more of the above phosphoric acids or phosphoric anhydrides, four or more of the above phosphoric acids or phosphoric anhydrides, or even five or more of the above phosphoric acids or phosphoric anhydrides.

When component (A1b) is phosphoric acid ($H_3PO_4$), typically the concentration of the acid used for component (A1b) is 85 percent by weight. It should be noted that various other concentrations of acids can be used for component (A1b) but the amount of component (A1b) in Part (A1), as detailed herein, is based on the use of phosphoric acid ($H_3PO_4$) with a concentration of 85 percent by weight. Accordingly, should a different compound be used for component (A1b), the amount thereof should be adjusted to yield the same amount of acid as if phosphoric acid ($H_3PO_4$) with a concentration of 85 percent by weight were used to provide the desired weight percentage of component (A1b) as detailed below.

Thus, as can be seen from the components of Part (A1) above, in one embodiment Part (A1) is an inorganic composition formed from components (A1a), (A1b) and (A1c), where Part (A1) has less than about 7.5 percent by weight carbon and/or other organic compounds, has less than about 5 percent by weight carbon and/or other organic compounds, has less than about 2.5 percent by weight carbon and/or other organic compounds, has less than about 1 percent by weight carbon and/or other organic compounds, has less than about 0.5 percent by weight carbon and/or other organic compounds, has less than about 0.1 percent by weight carbon and/or other organic compounds, or is even free of (that is has zero percent by weight) carbon and/or other organic compounds. Here, as well as elsewhere in the specification and claims, individual range values can be combined to form additional and/or non-disclosed ranges.

In still another embodiment, Part (A1) can further optionally include one or more additional additives such as one or more colorants, one or more anti-settling compounds (e.g., thixotropic agents), one or more viscosity modifiers, one or more thickeners (e.g., xanthan gum), one or more rheology modifiers, one or more pigments (e.g., $TiO_2$), one or more lignin compounds such as a calcium lignosulphonate (e.g., Norlig A from Borregaard LignoTech a binder for pan-granulation, seed coatings, extruded and/or spray-dried granules), or mixtures of any two or more, three or more, four or more, or even five or more thereof. Some of these additional additives may be organic in nature. Such additives are utilized to impart various desired properties to the mixture that forms the basis of Part (A1) of the present invention and permits Part (A1) to have improved shelf-life, improved rheological properties, improved mixability and/or sprayability, etc.

In the case where such one or more organic-based additives, or even one or more lignin compounds, are added to Part (A1), Part (A1) will include a minor amount of organic material. By minor amount it is meant that Part (A1) will have less than about 7.5 percent by weight carbon and/or other organic compounds, will have less than about 7 percent by weight carbon and/or other organic compounds, will have less than about 6.5 percent by weight carbon and/or other organic compounds, will have less than about 6 percent by weight carbon and/or other organic compounds, will have less than about 5.5 percent by weight carbon and/or other organic compounds, will have less than about 5 percent by weight carbon and/or other organic compounds, will have less than about 4.5 percent by weight carbon and/or other organic compounds, will have less than about 4 percent by weight carbon and/or other organic compounds, will have less than about 3.5 percent by weight carbon and/or other organic compounds, will have less than about 3. percent by weight carbon and/or other organic compounds, will have less than about 2.5 percent by weight carbon and/or other organic compounds, will have less than about 1 percent by weight carbon and/or other organic compounds, or will even have less than about 0.5 percent by weight carbon and/or other organic compounds. Here, as well as elsewhere in the specification and claims, individual range values can be combined to form additional and/or non-disclosed ranges.

Given the above, Part (A1) is formed from about 58 percent by weight to about 78 percent by weight component (A1a), from about 1 percent by weight to about 5 percent by weight component (A1b) and from about 17 percent by weight to about 37 percent by weight component (A1c). Optionally, Part (A1) can further include one or more additional additives such as one or more colorants, one or more anti-settling compounds (e.g., thixotropic agents), one or more viscosity modifiers, one or more thickeners (e.g., xanthan gum), one or more rheology modifiers, one or more pigments (e.g., $TiO_2$), one or more lignin compounds such as a calcium lignosulphonate (e.g., Norlig A from Borregaard LignoTech a binder for pan-granulation, seed coatings, extruded and/or spray-dried granules), or mixtures of any two or more, three or more, four or more, or even five or more thereof are present in total, or even individually, at a range of about 0.1 percent by weight to about 3 percent by weight. In one particular embodiment, Part (A1) further includes one or more additional additives such as one or more clay-based rheology modifiers (e.g., one or more clay-based rheology modifiers such as Attagel® a phyllo-silicate clay rheology modifier from BASF) at a range of about 0.1 percent by weight to about 2.5 percent by weight and/or one or more lignin compounds such as a calcium lignosulphonate at a range of about 0.1 percent by weight to about 2.5 percent by weight. Although the total amount of each component and/or optional component of Part (A1) may individually total more than 100 weight percent when each component is taken individually and totaled using the broadest amounts disclosed herein, one of skill in the art will realize that this is not the case. Rather, each individual component of Part (A1) can be varied within any stated range as desired in order to achieve a total weight percent of 100.

In another embodiment, Part (A1) is formed from about 60 percent by weight to about 76 percent by weight component (A1a), from about 62 percent by weight to about 74 percent by weight component (A1a), from about 64 percent by weight to about 72 percent by weight component (A1 a), from about 66 percent by weight to about 70 percent by weight component (A1a), or even about 68 percent by weight component (A1a). Here, as well as elsewhere in the specification and claims, individual range values can be combined to form additional and/or non-disclosed ranges.

In another embodiment, Part (A1) is formed from about 1.5 percent by weight to about 4.5 percent by weight component (A1b), from about 2 percent by weight to about 4 percent by weight component (A1b), from about 2.5 percent by weight to about 3.5 percent by weight component (A1b), or even about 3 percent by weight component (A1b). Here, as well as elsewhere in the specification and claims, individual range values can be combined to form additional and/or non-disclosed ranges.

In another embodiment, Part (A1) is formed from about 19 percent by weight to about 35 percent by weight component (A1c), from about 21 percent by weight to about 33 percent by weight component (A1c), from about 23 percent by weight to about 31 percent by weight component (A1c), from about 25 percent by weight to about 29 percent by weight component (A1c), or even about 27 percent by weight component (A1c). Here, as well as elsewhere in the specification and claims, individual range values can be combined to form additional and/or non-disclosed ranges.

If present, in another embodiment the one or more colorants, one or more anti-settling compounds (e.g., thixotropic agents), one or more viscosity modifiers, one or more thickeners (e.g., xanthan gum), one or more rheology modifiers, one or more pigments (e.g., $TiO_2$), one or more lignin compounds such as a calcium lignosulphonate (e.g., Norlig A from Borregaard LignoTech a binder for pan-granulation, seed coatings, extruded and/or spray-dried granules), or mixtures of any two or more, three or more, four or more, or even five or more thereof are present in total, or even individually, at a range of about 0.25 percent by weight to about 2.75 percent by weight, about 0.5 percent by weight to about 2.5 percent by weight, about 0.75 percent by weight to about 2.25 percent by weight, about 1 percent by weight to about 2 percent by weight, about 1.25 percent by weight to about 1.75 percent by weight, or even at about 1.5 percent by weight. Here, as well as elsewhere in the specification and claims, individual range values can be combined to form additional and/or non-disclosed ranges. If present, in another embodiment the one or more additional additives such as the one or more clay-based rheology modifiers (e.g., one or more clay-based rheology modifiers such as Attagel® a phyllosilicate clay rheology modifier from BASF) are present at a range of about 0.3 percent by weight to about 2.3 percent by weight, about 0.5 percent by weight to about 2.1 percent by weight, about 0.7 percent by weight to about 1.9 percent by weight, about 0.9 percent by weight to about 1.7 percent by weight, about 1.1 percent by weight to about 1.5 percent by weight, or even at about 1.3 percent by weight. Here, as well as elsewhere in the specification and claims, individual range values can be combined to form additional and/or non-disclosed ranges. If present, in another embodiment the one or more additional additives such as the one or more lignin compounds such as a calcium lignosulphonate are present at a range of about 0.3 percent by weight to about 2.3 percent by weight, about 0.5 percent by weight to about 2.1 percent by weight, about 0.7 percent by weight to about 1.9 percent by weight, about 0.9 percent by weight to about 1.7 percent by weight, about 1.1 percent by weight to about 1.5 percent by weight, or even at about 1.3 percent by weight. Here, as well as elsewhere in the specification and claims, individual range values can be combined to form additional and/or non-disclosed ranges.

In one embodiment, Part (A1) is formed by the following procedure: Step (i) pour the requisite and/or desired amount of water (component (A1c))—in this case 4.2 pounds—into a mixing bowl (component (A1c)—tap water or any other suitable type of water such as distilled water will suffice); Step (ii) start the mixer; Step (iii) as the mixer is mixing, add the requisite and/or desired amount—in this case 0.5 pounds—of component (A1b) (the 85 percent by weight phosphoric acid ($H_3PO_4$) or any suitable analog thereof as defined above). It should be noted that there might be slight heating of the water/(A1b) mixture, this is normal; and Step (iv) keep mixing and gradually start adding the requisite and/or desired amount—in this case 10.5 pounds—of component (A1a) (generally this component is in the form of a powder), initially the powder will dissolve, but as one continues mixing in more of the powder of component (A1a), it will not dissolve and a slurry will form. After Step (iv), if so desired, add any one or more optional additives described above (e.g., the one or more clay-based rheology modifiers and/or one or more lignin compounds such as a calcium lignosulphonate) at any desired amount—in this case 0.15 pounds of each of the Attagel and Norlig A detailed above are added to Part (A1). Once any optional step is complete, Part (A1) can be placed in a suitable shipping container for use at a later date as will be described below. Additionally, once the formulation of Part (A1) is complete, Part (A1) can be placed in a suitable shipping container for use at a later date as will be described below, with one or more of Part (B1) and/or Part (B2).

As would be apparent to those of skill in the art, while various specific amounts of the various components used to produce Part (A1), these amounts are exemplary in nature and can be modified accordingly to produce a larger, or even smaller, amount of Part (A1).

Part (A2)

Regarding Part (A2), Part (A2) is in one embodiment formed from a combination of: (A2a) at least one metal compound, metal oxide or an equivalent thereof; (A2b) phosphoric acid ($H_3PO_4$) or an equivalent thereof; and (A2c) water. In another embodiment, mixtures of any two or more, three or more, or even four or more metals, metal oxides, or equivalents thereof can be utilized in place of component (A2a).

Regarding component (A2a), component (A2a) is formed from one or more metal powders or one or more metal oxide powders selected from one or more aluminum metal powders, one or more aluminum oxide powders, one or more zinc metal powders, one or more zinc oxide powders, one or more iron metal powders, one or more iron oxide powders, one or more titanium metal powders, one or more titanium oxide powders, one or more magnesium metal powders, one or more magnesium oxide powders, one or more copper metal powders, one or more copper oxide powders, one or more manganese metal powders, one or more manganese oxide powders, or any mixture of two or more thereof, or any mixture of three or more thereof, or any mixture of four or more thereof, or even any mixture of five or more thereof. In still another embodiment, component (A2a) is formed from a combination of one or more aluminum metal powders and/or one or more aluminum oxide powders in combination with one or more zinc metal powders and/or one or more zinc oxide powders in further combination with one or more magnesium metal powders and/or one or more magnesium oxide powders. In this embodiment, any of the additional metals and/or metal oxide compounds not in the three metal mixture of aluminum, zinc and magnesium can optionally be added as additional compounds at similar amounts as specified below for the one or more additional additives such as, for example, the rheology modifiers and/or the one or more lignin compounds.

In one embodiment, component (A2a) is itself formed from a mixture of from about 21 percent by weight to about 41 aluminum metal powder, from about 54 percent by weight to about 74 percent by weight zinc metal powder and from about 1 percent by weight to about 9 percent by weight magnesium metal powder. In the instance where metal oxide powders are utilized in place of the above mentioned aluminum, zinc and magnesium metal powders, such oxide powders can be utilized the ranges stated above for each respective similar metal powder. Although the total amount of each part of component (A2a) may individually total more than 100 weight percent when each component is taken individually and totaled using the broadest amounts disclosed herein, one of skill in the art will realize that this is not the case. Rather, each individual part of component (A2a) can be varied within any stated range as desired in order to achieve a total weight percent of 100.

In another embodiment, the aluminum portion of component (A2a) is formed from about 23 percent by weight to about 39 percent by weight aluminum metal powder or aluminum oxide powder, from about 25 percent by weight to about 37 percent by weight aluminum metal powder or aluminum oxide powder, from about 27 percent by weight to about 35 percent by weight aluminum metal powder or aluminum oxide powder, from about 29 percent by weight to about 33 percent by weight aluminum metal powder or aluminum oxide powder, or even about 31 percent by weight aluminum metal powder or aluminum oxide powder. Here, as well as elsewhere in the specification and claims, individual range values can be combined to form additional and/or non-disclosed ranges.

In another embodiment, the zinc portion of component (A2a) is formed from about 56 percent by weight to about 72 percent by weight zinc metal powder or zinc oxide powder, from about 58 percent by weight to about 70 percent by weight zinc metal powder or zinc oxide powder, from about 60 percent by weight to about 68 percent by weight zinc metal powder or zinc oxide powder, from about 62 percent by weight to about 66 percent by weight zinc metal powder or zinc oxide powder, or even about 64 percent by weight zinc metal powder or zinc oxide powder. Here, as well as elsewhere in the specification and claims, individual range values can be combined to form additional and/or non-disclosed ranges.

In another embodiment, the magnesium portion of component (A2a) is formed from about 1.5 percent by weight to about 8.5 percent by weight magnesium metal powder or magnesium oxide powder, from about 2 percent by weight to about 8 percent by weight magnesium metal powder or magnesium oxide powder, from about 2.5 percent by weight to about 7.5 percent by weight magnesium metal powder or magnesium oxide powder, from about 3 percent by weight to about 7 percent by weight magnesium metal powder or magnesium oxide powder, from about 3.5 percent by weight to about 6.5 percent by weight magnesium metal powder or magnesium oxide powder, from about 4 percent by weight to about 6 percent by weight magnesium metal powder or magnesium oxide powder, or even about 5 percent by weight magnesium metal powder or magnesium oxide powder. Here, as well as elsewhere in the specification and claims, individual range values can be combined to form additional and/or non-disclosed ranges.

In another embodiment, component (A2b) of Part (A2)—the phosphoric acid ($H_3PO_4$)—can be replaced by a mixture of one or more other phosphoric acids or phosphoric anhydrides including, but not limited to, one or more of orthophosphoric acid ($H_3PO_4$) (also referred to herein as just phosphoric acid), pyrophosphoric acid ($H_4P_2O_7$), tripolyphosphoric acid ($H_5P_3O_{10}$), tetrapolyphosphoric acid ($H_6P_4O_{13}$), trimetaphosphoric acid ($H_3P_3O_9$), phosphoric anhydride ($P_4O_{10}$) and/or pyrophosphoric acid ($H_4P_2O_7$). In another embodiment, component (A2b) of Part (A2)—the phosphoric acid ($H_3PO_4$)—can be replaced by a mixture of two or more of the above phosphoric acids or phosphoric anhydrides, three or more of the above phosphoric acids or phosphoric anhydrides, four or more of the above phosphoric acids or phosphoric anhydrides, or even five or more of the above phosphoric acids or phosphoric anhydrides.

When component (A2b) is phosphoric acid ($H_3PO_4$), typically the concentration of the acid used for component (A2b) is 85 percent by weight. It should be noted that various other concentrations of acids can be used for component (A2b) but the amount of component (A2b) in Part (A2), as detailed herein, is based on the use of phosphoric acid ($H_3PO_4$) with a concentration of 85 percent by weight. Accordingly, should a different compound be used for component (A2b), the amount thereof should be adjusted to yield the same amount of acid as if phosphoric acid ($H_3PO_4$) with a concentration of 85 percent by weight were used to provide the desired weight percentage of component (A2b) as detailed below.

Thus, as can be seen from the components of Part (A2) above, in one embodiment Part (A2) is an inorganic composition formed from components (A2a), (A2b) and (A2c), where Part (A2) has less than about 7.5 percent by weight carbon and/or other organic compounds, has less than about 5 percent by weight carbon and/or other organic compounds, has less than about 2.5 percent by weight carbon and/or other organic compounds, has less than about 1 percent by weight carbon and/or other organic compounds, has less than about 0.5 percent by weight carbon and/or other organic compounds, has less than about 0.1 percent by weight carbon and/or other organic compounds, or is even free of (that is has zero percent by weight) carbon and/or other organic compounds. Here, as well as elsewhere in the specification and claims, individual range values can be combined to form additional and/or non-disclosed ranges.

In still another embodiment, Part (A2) can further optionally include one or more additional additives such as colorants, one or more anti-settling compounds (e.g., thixotropic agents), one or more viscosity modifiers, one or more thickeners (e.g., xanthan gum), one or more rheology modifiers, one or more pigments (e.g., $TiO_2$), one or more lignin compounds such as a calcium lignosulphonate (e.g., Norlig A from Borregaard LignoTech a binder for pan-granulation, seed coatings, extruded and/or spray-dried granules), or mixtures of any two or more, three or more, four or more, or even five or more thereof. Some of these additional additives may be organic in nature. Such additives are utilized to impart various desired properties to the mixture that forms the basis of Part (A2) of the present invention and permits Part (A2) to have improved shelf-life, improved rheological properties, improved mixability and/or sprayability, etc.

In the case where such one or more organic-based additives, or even one or more lignin compounds, are added to Part (A2), Part (A2) will include a minor amount of organic material. By minor amount it is meant that Part (A2) will have less than about 7.5 percent by weight carbon and/or other organic compounds, will have less than about 7 percent by weight carbon and/or other organic compounds, will have less than about 6.5 percent by weight carbon and/or other organic compounds, will have less than about 6 percent by weight carbon and/or other organic compounds, will have less than about 5.5 percent by weight carbon and/or other organic compounds, will have less than about 5 percent by weight carbon and/or other organic compounds, will have less than about 4.5 percent by weight carbon and/or other organic compounds, will have less than about 4 percent by weight carbon and/or other organic compounds, will have less than about 3.5 percent by weight carbon and/or other organic compounds, will have less than about 3. percent by weight carbon and/or other organic compounds, will have less than about 2.5 percent by weight carbon and/or other organic compounds, will have less than about 1 percent by weight carbon and/or other organic compounds, or will even have less than about 0.5 percent by weight carbon and/or other organic compounds. Here, as well as elsewhere in the specification and claims, individual range values can be combined to form additional and/or non-disclosed ranges.

Given the above, Part (A2) is formed from about 5 percent by weight to about 17 percent by weight component (A2a), from about 44 percent by weight to about 64 percent by weight component (A2b) and from about 24 percent by weight to about 44 percent by weight component (A2c). Optionally, Part (A2) can further include one or more additional additives such as one or more colorants, one or more anti-settling compounds (e.g., thixotropic agents), one or more viscosity modifiers, one or more thickeners (e.g., xanthan gum), one or more rheology modifiers, one or more pigments (e.g., $TiO_2$), one or more lignin compounds such as a calcium lignosulphonate (e.g., Norlig A from Borregaard LignoTech a binder for pan-granulation, seed coatings, extruded and/or spray-dried granules), or mixtures of any two or more, three or more, four or more, or even five or more thereof are present in total, or even individually, at a range of about 0.1 percent by weight to about 3 percent by weight. In one particular embodiment, Part (A2) further includes one or more additional additives such as one or more clay-based rheology modifiers (e.g., one or more clay-based rheology modifiers such as Attagel® a phyllosilicate clay rheology modifier from BASF) at a range of about 0.1 percent by weight to about 2.5 percent by weight and/or one or more lignin compounds such as a calcium lignosulphonate at a range of about 0.1 percent by weight to about 2.5 percent by weight. Although the total amount of each component and/or optional component of Part (A2)

may individually total more than 100 weight percent when each component is taken individually and totaled using the broadest amounts disclosed herein, one of skill in the art will realize that this is not the case. Rather, each individual component of Part (A2) can be varied within any stated range as desired in order to achieve a total weight percent of 100.

In another embodiment, Part (A2) is formed from about 7 percent by weight to about 15 percent by weight component (A2a), from about 8 percent by weight to about 14 percent by weight component (A2a), from about 9 percent by weight to about 13 percent by weight component (A2a), from about 10 percent by weight to about 12 percent by weight component (A2a), or even about 11 percent by weight component (A2a). Here, as well as elsewhere in the specification and claims, individual range values can be combined to form additional and/or non-disclosed ranges.

Given the above weight ranges for component (A2a) in Part (A2), one of skill in the art would recognize that, in one embodiment, the weight amount of component (A2a) is formed from the various weight ranges of the one or more metal powders and/or metal oxide powders discussed above in connection with component (A2a). In such an embodiment, the weight ranges for the one or more metal powders and/or metal oxide powders of component (A2a) are based on the portions of such one or more metal powders and/or metal oxide powders in the weight amount of component (A2a). That is, the weight amount of component (A2a) is treated as a full 100 weight percent amount to calculate the weight portion amounts of the one or more metal powders and/or metal oxide powders of component (A2a).

In another embodiment, Part (A2) is formed from about 46 percent by weight to about 62 percent by weight component (A2b), from about 48 percent by weight to about 60 percent by weight component (A2b), from about 50 percent by weight to about 58 percent by weight component (A2b), from about 52 percent by weight to about 56 percent by weight component (A2b), or even about 54 percent by weight component (A2b). Here, as well as elsewhere in the specification and claims, individual range values can be combined to form additional and/or non-disclosed ranges.

In another embodiment, Part (A2) is formed from about 26 percent by weight to about 42 percent by weight component (A2c), from about 28 percent by weight to about 40 percent by weight component (A2c), from about 30 percent by weight to about 38 percent by weight component (A2c), or even about 34 percent by weight component (A2c). Here, as well as elsewhere in the specification and claims, individual range values can be combined to form additional and/or non-disclosed ranges.

If present, in another embodiment the one or more colorants, one or more anti-settling compounds (e.g., thixotropic agents), one or more viscosity modifiers, one or more thickeners (e.g., xanthan gum), one or more rheology modifiers, one or more pigments (e.g., $TiO_2$), one or more lignin compounds such as a calcium lignosulphonate (e.g., Norlig A from Borregaard LignoTech a binder for pan-granulation, seed coatings, extruded and/or spray-dried granules), or mixtures of any two or more, three or more, four or more, or even five or more thereof are present in total, or even individually, at a range of about 0.25 percent by weight to about 2.75 percent by weight, about 0.5 percent by weight to about 2.5 percent by weight, about 0.75 percent by weight to about 2.25 percent by weight, about 1 percent by weight to about 2 percent by weight, about 1.25 percent by weight to about 1.75 percent by weight, or even at about 1.5 percent by weight. Here, as well as elsewhere in the specification and claims, individual range values can be combined to form additional and/or non-disclosed ranges. If present, in another embodiment the one or more additional additives such as the one or more clay-based rheology modifiers (e.g., one or more clay-based rheology modifiers such as Attagel® a phyllosilicate clay rheology modifier from BASF) are present at a range of about 0.3 percent by weight to about 2.3 percent by weight, about 0.5 percent by weight to about 2.1 percent by weight, about 0.7 percent by weight to about 1.9 percent by weight, about 0.9 percent by weight to about 1.7 percent by weight, about 1.1 percent by weight to about 1.5 percent by weight, or even at about 1.3 percent by weight. Here, as well as elsewhere in the specification and claims, individual range values can be combined to form additional and/or non-disclosed ranges. If present, in another embodiment the one or more additional additives such as the one or more lignin compounds such as a calcium lignosulphonate are present at a range of about 0.3 percent by weight to about 2.3 percent by weight, about 0.5 percent by weight to about 2.1 percent by weight, about 0.7 percent by weight to about 1.9 percent by weight, about 0.9 percent by weight to about 1.7 percent by weight, about 1.1 percent by weight to about 1.5 percent by weight, or even at about 1.3 percent by weight. Here, as well as elsewhere in the specification and claims, individual range values can be combined to form additional and/or non-disclosed ranges.

In one embodiment, Part (A2) is formed by the following procedure: Step (i) prepare 52 percent by weight $H_3PO_4$ solution via the following procedure—take 50 grams of 85 percent by weight $H_3PO_4$ solution and add 32 grams of water, then mix well to yield 82 grams of the desired concentration of $H_3PO_4$ solution; Step (ii) stir in 3.45 grams of aluminum metal powder into the $H_3PO_4$ solution—additionally, the solution should be heated if needed to dissolve Al so as to obtain a clear fluid when all aluminum metal powder is dissolved; Step (iii) add 7.2 grams of zinc metal powder into this solution, keep stirring until all of the zinc metal powder is dissolved—the resulting solution should still look very clear; and Step (iv) one can stop at this point to yield a Part (A2) solution that is suitable for use with either Part (B1) or Part (B2) as a coating for glass applications. Should one desire a coating prepared from Part (A2) solution with either Part (B1) or Part (B2) suitable for non-glass coating applications, the following additional steps should be completed: Step (v) add 0.56 grams of magnesium metal powder to the solution from Step (iii) above and stir until all of the magnesium metal powder is dissolved; Step (vi) keep the solution stirring for about one hour, measure the pH thereof, it should be around 3; Step (vii) measure the pH next day, it may increase slightly over night, but should be between about 3 and about 3.3. This solution is good for use in metal coating applications (such as a coating for carbon steel) when combined, as will be detailed below, with one of Part (B1) or Part (B2) coatings on carbon steel. Additionally, once the formulation of Part (A2) is complete, Part (A2) can be placed in a suitable shipping container for use at a later date as will be described below, with one or more of Part (B1) and/or Part (B2). After Step (iv) above or even after Step (v) above, any one or more optional additives described herein can be added to Part (A2).

As would be apparent to those of skill in the art, while various specific amounts of the various components used to produce Part (A2), these amounts are exemplary in nature and can be modified accordingly to produce a larger, or even smaller, amount of Part (A2).

Part (B1)

Regarding Part (B1), Part (B1) is in one embodiment formed from a combination of: (B1a) at least one silica-based glass powder or equivalent thereof; (B1b) at least one metal oxide or an equivalent thereof; and (B1c) water.

Regarding component (B1a), component (B1a) is formed from a mixture of four inorganic compounds: silicon dioxide (i.e., silica—$SiO_2$) or an equivalent, at least one form of aluminum oxide (i.e., alumina—$Al_2O_3$) whether anhydrous or hydrated, calcium fluoride ($CaF_2$) and sodium hexafluoroaluminate (i.e., cryolite—$Na_3AlF_6$) that are mixed together (in one instance all four of the above-listed compounds are in powder form), vitrified and then powderized/pulverized/crushed into a powder to form component (B1a) of Part (B1).

While other aluminosilicate based materials can be used for component (B1a) of Part (B1), the following is one suitable embodiment of an aluminosilicate based material for component (B1a). In one embodiment, a suitable aluminosilicate based material for component (B1a) is formed from a combination of about 23 percent by weight to about 43 percent by weight of silicon dioxide (i.e., silica—$SiO_2$), from about 23 percent by weight to about 43 percent by weight of at least one form of aluminum oxide (i.e., alumina—$Al_2O_3$), whether anhydrous or hydrated, from about 18 percent by weight to about 38 percent by weight of calcium fluoride ($CaF_2$), and from about 1 percent by weight to about 11 percent by weight of sodium hexafluoroaluminate (i.e., cryolite—$Na_3AlF_6$). Although the total amount of each component and/or optional component of component (B1a) may individually total more than 100 weight percent when each component is taken individually and totaled using the broadest amounts disclosed herein, one of skill in the art will realize that this is not the case. Rather, each individual component of component (B1a) can be varied within any stated range as desired in order to achieve a total weight percent of 100.

In another embodiment, component (B1a) is formed from about 25 percent by weight to about 41 percent by weight of silicon dioxide (i.e., silica—$SiO_2$), from about 27 percent by weight to about 39 percent by weight of silicon dioxide (i.e., silica—$SiO_2$), from about 29 percent by weight to about 37 percent by weight of silicon dioxide (i.e., silica—$SiO_2$), from about 31 percent by weight to about 35 percent by weight of silicon dioxide (i.e., silica—$SiO_2$), or even about 33 percent by weight of silicon dioxide (i.e., silica—$SiO_2$). Here, as well as elsewhere in the specification and claims, individual range values can be combined to form additional and/or non-disclosed ranges.

In another embodiment, component (B1a) is formed from about 25 percent by weight to about 41 percent by weight of at least one form of aluminum oxide (i.e., alumina—$Al_2O_3$), from about 27 percent by weight to about 39 percent by weight of at least one form of aluminum oxide (i.e., alumina—$Al_2O_3$), from about 29 percent by weight to about 37 percent by weight of at least one form of aluminum oxide (i.e., alumina—$Al_2O_3$), from about 31 percent by weight to about 35 percent by weight of at least one form of aluminum oxide (i.e., alumina—$Al_2O_3$), or even about 33 percent by weight of at least one form of aluminum oxide (i.e., alumina—$Al_2O_3$). Here, as well as elsewhere in the specification and claims, individual range values can be combined to form additional and/or non-disclosed ranges.

In another embodiment, component (B1a) is formed from about 20 percent by weight to about 36 percent by weight of calcium fluoride ($CaF_2$), from about 22 percent by weight to about 34 percent by weight of calcium fluoride ($CaF_2$), from about 24 percent by weight to about 32 percent by weight of calcium fluoride ($CaF_2$), from about 26 percent by weight to about 30 percent by weight of calcium fluoride ($CaF_2$), or even about 28 percent by weight of calcium fluoride ($CaF_2$). Here, as well as elsewhere in the specification and claims, individual range values can be combined to form additional and/or non-disclosed ranges.

In another embodiment, component (B1a) is formed from about 2 percent by weight to about 10 percent by weight of sodium hexafluoroaluminate (i.e., cryolite—$Na_3AlF_6$), from about 3 percent by weight to about 9 percent by weight of sodium hexafluoroaluminate (i.e., cryolite—$Na_3AlF_6$), from about 4 percent by weight to about 8 percent by weight of sodium hexafluoroaluminate (i.e., cryolite—$Na_3AlF_6$), from about 5 percent by weight to about 7 percent by weight of sodium hexafluoroaluminate (i.e., cryolite—$Na_3AlF_6$), or even about 6 percent by weight sodium hexafluoroaluminate (i.e., cryolite—$Na_3AlF_6$). Here, as well as elsewhere in the specification and claims, individual range values can be combined to form additional and/or non-disclosed ranges.

Given the above, once suitable amounts of the various four components of component (B1a) are selected, all four powders are mixed homogeneously prior to vitrification. Since the four components for the formation of component (B1a) contain silicon dioxide (i.e., silica) and aluminum oxide (i.e., alumina), a crucible formed from either of these materials are compatible for mixing the materials prior to the vitrification thereof. The use of a suitable crucible formed from a suitable material as detailed herein assures that there will be no serious contamination issue with the powders used to form component (B1a) prior to vitrification. Thus, it is important to avoid contamination via any metal, metal oxide, or metal alloy (e.g., iron and/or steel) in the powder mixture that is going to be vitrified to form component (B1a) of Part (B1). While not wishing to be bound to any one theory, it is believed that any metals, metal oxides, or metal alloys will interfere with the subsequent chemical processes used for production of final coating products.

Next, vitrification is conducted on the aforementioned mixture of four powdered components at a temperature of at least about 1300° C. for a period of at least about three hours. Higher vitrification temperatures can be used if required for complete vitrification of the powder. Thus, in one embodiment, the vitrification temperature can be at least about 1350° C., at least about 1400° C., at least about 1450° C., at least about 1500° C., at least about 1550° C., at least about 1600° C., at least about 1650° C., at least about 1700° C., at least about 1750° C., at least about 1800° C., at least about 1850° C., at least about 1900° C., at least about 1950° C., or even at least about 2000° C. In one embodiment, vitrification is conducted at any suitable temperature as detailed above for at least about 3.5 hours, at least about 4 hours, at least about 4.5 hours, at least about 5 hours, at least about 5.5 hours, or even at least about 6 hours. Here, as well as elsewhere in the specification and claims, individual range values can be combined to form additional and/or non-disclosed ranges.

After vitrification the resulting melt is subjected to normal cooling procedures by setting aside the vitrified mixture and allowing same to gradually and naturally cool to room temperature. This is accomplished by taking the glass melt out of a kiln and pouring same onto a bed of silica material. No special steps need be taken to avoid any fracture resulting from shock cooling, as the vitrified glass material is subsequently be ground to very fine powder per the procedure below.

Pulverization of the vitrified product to yield component (B1a) for use in Part (B1) is accomplished using a mortar and pestle, or some other suitable equipment, until the particle of the ground up vitrified material is as follows: average particle size is about 10 µm, at least about 75 percent by weight of the particles have a particle size of less than about 5 µm, all of the ground up vitrified particles have a particle size of less than about 15 µm, and the surface area of any given particle is on average about 0.87 µm$^{-1}$.

Regarding component (B1b), component (B1b) is formed from one or more metal oxide powders selected from one or more aluminum oxide powders, one or more zinc oxide powders, one or more iron oxide powders, one or more titanium oxide powders, one or more magnesium oxide powders, one or more copper oxide powders, one or more manganese oxide powders, one or more or calcium oxide powders, any mixture of two or more thereof, or any mixture of three or more thereof, or any mixture of four or more thereof, or even any mixture of five or more thereof. In still another embodiment, component (B1b) is formed from a mixture of one or more magnesium oxide powders. In this embodiment, any of the additional metal oxide compounds listed above can optionally be added as additional compounds at similar amounts as specified below for the rheology modifiers and/or the one or more lignin compounds.

Thus, as can be seen from the components of Part (B1) above, in one embodiment Part (B1) is an inorganic composition formed from components (B1a), (B1b) and (B1c), where Part (B1) has less than about 7.5 percent by weight carbon and/or other organic compounds, has less than about 5 percent by weight carbon and/or other organic compounds, has less than about 2.5 percent by weight carbon and/or other organic compounds, has less than about 1 percent by weight carbon and/or other organic compounds, has less than about 0.5 percent by weight carbon and/or other organic compounds, has less than about 0.1 percent by weight carbon and/or other organic compounds, or is even free of (that is has zero percent by weight) carbon and/or other organic compounds. Here, as well as elsewhere in the specification and claims, individual range values can be combined to form additional and/or non-disclosed ranges.

In still another embodiment, Part (B1) can further optionally include one or more additional additives such as one or more colorants, one or more anti-settling compounds (e.g., thixotropic agents), one or more viscosity modifiers, one or more thickeners (e.g., xanthan gum), one or more rheology modifiers, one or more pigments (e.g., TiO$_2$), one or more lignin compounds such as a calcium lignosulphonate (e.g., Norlig A from Borregaard LignoTech a binder for pan-granulation, seed coatings, extruded and/or spray-dried granules), one or more fibers, one or more milled glass fibers (e.g., fiberglass fibers, etc.), one or more kaolin-bearing compounds, one or more types and/or concentrations of boric acid (e.g., H$_3$BO$_3$), or mixtures of any two or more, three or more, four or more, or even five or more thereof. Some of these additional additives may be organic in nature. Such additives are utilized to impart various desired properties to the mixture that forms the basis of Part (B1) of the present invention and permits Part (B1) to have improved shelf-life, improved rheological properties, improved mixability and/or sprayability, improved coating strength, etc.

As used herein, the terms "-bearing compound(s)" and "-containing compound(s)" are used interchangeably. For example, the terms "kaolin-bearing compound" and "kaolin-containing compound" are to be construed as the same and as noted above are utilized interchangeably. As would be apparent, this distinction applies equally to all terms that utilize the same constructs noted herein. In one embodiment, the kaolin-bearing compound(s) of the present invention is/are any kaolin-containing compound (e.g., kaolinite which is a mineral that is contained in kaolin clays and which has a chemical composition of Al$_2$Si$_2$O$_5$(OH)$_4$). Accordingly, as used herein, "kaolin" is defined to mean, and encompass, any clay that contains a sufficient amount of kaolin therein (e.g., any clay that is at least 50 weight percent kaolin), or any clay or other compound that contains a sufficient amount of the mineral kaolinite (Al$_2$Si$_2$O$_5$(OH)$_4$) (e.g., any clay, or other compound, that is at least 50 weight percent kaolinite).

In the case where such one or more organic-based additives, or even one or more lignin compounds, are added to Part (B1), Part (B1) will include a minor amount of organic material. By minor amount it is meant that Part (B1) will have less than about 7.5 percent by weight carbon and/or other organic compounds, will have less than about 7 percent by weight carbon and/or other organic compounds, will have less than about 6.5 percent by weight carbon and/or other organic compounds, will have less than about 6 percent by weight carbon and/or other organic compounds, will have less than about 5.5 percent by weight carbon and/or other organic compounds, will have less than about 5 percent by weight carbon and/or other organic compounds, will have less than about 4.5 percent by weight carbon and/or other organic compounds, will have less than about 4 percent by weight carbon and/or other organic compounds, will have less than about 3.5 percent by weight carbon and/or other organic compounds, will have less than about 3. percent by weight carbon and/or other organic compounds, will have less than about 2.5 percent by weight carbon and/or other organic compounds, will have less than about 1 percent by weight carbon and/or other organic compounds, or will even have less than about 0.5 percent by weight carbon and/or other organic compounds. Here, as well as elsewhere in the specification and claims, individual range values can be combined to form additional and/or non-disclosed ranges.

Given the above, Part (B1) is formed from about 30 percent by weight to about 50 percent by weight component (B1a), from about 12 percent by weight to about 32 percent by weight component (B1b) and from about 23 percent by weight to about 43 percent by weight component (B1c). Optionally, Part (B1) can further include one or more colorants, one or more anti-settling compounds (e.g., thixotropic agents), one or more viscosity modifiers, one or more thickeners (e.g., xanthan gum), one or more rheology modifiers, one or more pigments (e.g., TiO$_2$), one or more lignin compounds such as a calcium lignosulphonate (e.g., Norlig A from Borregaard LignoTech a binder for pan-granulation, seed coatings, extruded and/or spray-dried granules), one or more fibers, one or more milled glass fibers (e.g., fiberglass fibers, etc.), one or more kaolin-bearing compounds, one or more types and/or concentrations of boric acid (e.g., H$_3$BO$_3$), or mixtures of any two or more, three or more, four or more, or even five or more thereof are present in total, or even individually, at a range of about 0.1 percent by weight to about 3 percent by weight. In one particular embodiment, Part (B1) further includes one or more additional additives such as one or more additional additives such as one or more clay-based rheology modifiers (e.g., one or more clay-based rheology modifiers such as Attagel® a phyllosilicate clay rheology modifier from BASF) at a range of about 0.1 percent by weight to about 2.5 percent by weight, the one or more lignin compounds such as a calcium lignosulphonate at a range of about 0.1 percent by weight to about 2.5 percent, the one or more milled glass fibers such as fiberglass fibers at a range of about 0.1 percent by weight to about 5 percent and/or the one or more kaolin compounds or kaolin-bearing compounds at a range of about 0.1 percent by weight to about 5 percent by weight. Although the total amount of each component and/or optional component of Part (B1) may individually total more than 100 weight percent when each component is taken individually and totaled using the broadest amounts disclosed herein, one of skill in the art will realize that this is not the case. Rather, each individual component of Part (B1) can be varied within any stated range as desired in order to achieve a total weight percent of 100.

In another embodiment, Part (B1) is formed from about 32 percent by weight to about 48 percent by weight component (B1a), from about 34 percent by weight to about 46 percent by weight component (B1a), from about 36 percent by weight to about 44 percent by weight component (B1a), from about 38 percent by weight to about 42 percent by weight component (B1a), or even about 40 percent by weight component (B1a). Here, as well as elsewhere in the specification and claims, individual range values can be combined to form additional and/or non-disclosed ranges.

In another embodiment, Part (B1) is formed from about 14 percent by weight to about 30 percent by weight component (B1b), from about 16 percent by weight to about 28 percent by weight component (B1b), from about 18 percent by weight to about 26 percent by weight component (B1b), from about 20 percent by weight to about 24 percent by weight component (B1b), or even about 22 percent by weight component (B1b). Here, as well as elsewhere in the specification and claims, individual range values can be combined to form additional and/or non-disclosed ranges.

In another embodiment, Part (B1) is formed from about 25 percent by weight to about 41 percent by weight component (B1c), from about 27 percent by weight to about 39 percent by weight component (B1c), from about 29 percent by weight to about 37 percent by weight component (B1c), from about 31 percent by weight to about 35 percent by weight component (B1c), or even about 33 percent by weight component (B1c). Here, as well as elsewhere in the specification and claims, individual range values can be combined to form additional and/or non-disclosed ranges.

If present, in another embodiment the one or more colorants, one or more anti-settling compounds (e.g., thixotropic agents), one or more viscosity modifiers, one or more thickeners (e.g., xanthan gum), one or more rheology modifiers, one or more pigments (e.g., $TiO_2$), one or more lignin compounds such as a calcium lignosulphonate (e.g., Norlig A from Borregaard LignoTech a binder for pan-granulation, seed coatings, extruded and/or spray-dried granules), one or more fibers, one or more milled glass fibers (e.g., fiberglass fibers, etc.), one or more kaolin-bearing compounds, one or more types and/or concentrations of boric acid (e.g., $H_3BO_3$), or mixtures of any two or more, three or more, four or more, or even five or more thereof are present in total, or even individually, at a range of about 0.25 percent by weight to about 2.75 percent by weight, about 0.5 percent by weight to about 2.5 percent by weight, about 0.75 percent by weight to about 2.25 percent by weight, about 1 percent by weight to about 2 percent by weight, about 1.25 percent by weight to about 1.75 percent by weight, or even at about 1.5 percent by weight. Here, as well as elsewhere in the specification and claims, individual range values can be combined to form additional and/or non-disclosed ranges. If present, in another embodiment the one or more additional additives such as the one or more clay-based rheology modifiers (e.g., one or more clay-based rheology modifiers such as Attagel® a phyllosilicate clay rheology modifier from BASF) are present at a range of about 0.3 percent by weight to about 2.3 percent by weight, about 0.5 percent by weight to about 2.1 percent by weight, about 0.7 percent by weight to about 1.9 percent by weight, about 0.9 percent by weight to about 1.7 percent by weight, about 1.1 percent by weight to about 1.5 percent by weight, or even at about 1.3 percent by weight. Here, as well as elsewhere in the specification and claims, individual range values can be combined to form additional and/or non-disclosed ranges. If present, in another embodiment the one or more additional additives such as the one or more lignin compounds such as a calcium lignosulphonate are present at a range of about 0.3 percent by weight to about 2.3 percent by weight, about 0.5 percent by weight to about 2.1 percent by weight, about 0.7 percent by weight to about 1.9 percent by weight, about 0.9 percent by weight to about 1.7 percent by weight, about 1.1 percent by weight to about 1.5 percent by weight, or even at about 1.3 percent by weight. Here, as well as elsewhere in the specification and claims, individual range values can be combined to form additional and/or non-disclosed ranges.

If present, the one or more additional additives such as the one or more milled glass fibers such as fiberglass fibers are present at a range of about 0.3 percent by weight to about 4.8 percent by weight, about 0.5 percent by weight to about 4.6 percent by weight, about 0.7 percent by weight to about 4.4 percent by weight, about 0.9 percent by weight to about 4.2 percent by weight, about 1.1 percent by weight to about 4 percent by weight, about 1.3 percent by weight to about 3.8 percent by weight, about 1.5 percent by weight to about 3.6 percent by weight, about 1.7 percent by weight to about 3.4 percent by weight, about 1.9 percent by weight to about 3.2 percent by weight, about 2.1 percent by weight to about 3 percent by weight, about 2.3 percent by weight to about 2.8 percent by weight, or even at about 2.5 percent by weight. Here, as well as elsewhere in the specification and claims, individual range values can be combined to form additional and/or non-disclosed ranges. If present, the one or more additional additives such as the one or more kaolin compounds or kaolin-bearing compounds are present at a range of about 0.3 percent by weight to about 4.8 percent by weight, about 0.5 percent by weight to about 4.6 percent by weight, about 0.7 percent by weight to about 4.4 percent by weight, about 0.9 percent by weight to about 4.2 percent by weight, about 1.1 percent by weight to about 4 percent by weight, about 1.3 percent by weight to about 3.8 percent by weight, about 1.5 percent by weight to about 3.6 percent by weight, about 1.7 percent by weight to about 3.4 percent by weight, about 1.9 percent by weight to about 3.2 percent by weight, about 2.1 percent by weight to about 3 percent by weight, about 2.3 percent by weight to about 2.8 percent by weight, or even at about 2.5 percent by weight. Here, as well as elsewhere in the specification and claims, individual range values can be combined to form additional and/or non-disclosed ranges.

In one embodiment, Part (B1) is formed by the following procedure: Step (i) measure 26 pounds (or roughly 3.12 gallons) of water in a suitable container or bucket (component (B1c)—tap water or any other suitable type of water such as distilled water will suffice), Step (ii) pour the desired amount of water into a suitably sized mixer and start the mixer; Step (iii) as the mixer is mixing, slowly add 40 pounds of component (B1a) and continue to mix; Step (iv)

as the water/component (B1a) mixture is mixing slowly add 17.1 pounds of component (B1b) (in this case it is magnesium oxide powder but can be other meal oxide powders as noted above), continue to mix the resulting mixture slowly; and Step (v) add 1 pound of each of the optional additives (i.e., the milled fibers, the kaolin, the Attagel® and the Norlig A) one by one and mix until one obtains a homogeneous paste.

As would be apparent to those of skill in the art, while various specific amounts of the various components used to produce Part (B1), these amounts are exemplary in nature and can be modified accordingly to produce a larger, or even smaller, amount of Part (B1).

Part (B2)

Regarding Part (B2), Part (B2) is in one embodiment formed from a combination of: (B2a) at least one silica-based glass powder or equivalent thereof; (B2b) at least one metal oxide or an equivalent thereof; and (B2c) water.

Regarding component (B2a), component (B2a) is formed from a mixture of four inorganic compounds: silicon dioxide (i.e., silica—$SiO_2$) or an equivalent, at least one form of aluminum oxide (i.e., alumina—$Al_2O_3$) whether anhydrous or hydrated, calcium fluoride ($CaF_2$) and sodium hexafluoroaluminate (i.e., cryolite—$Na_3AlF_6$) that are mixed together (in one instance all four of the above-listed compounds are in powder form), vitrified and then powderized/pulverized/crushed into a powder to form component (B2a) of Part (B2).

While other aluminosilicate based materials can be used for component (B2a) of Part (B2), the following is one suitable embodiment of an aluminosilicate based material for component (B2a). In one embodiment, a suitable aluminosilicate based material for component (B2a) is formed from a combination of about 23 percent by weight to about 43 percent by weight of silicon dioxide (i.e., silica—$SiO_2$), from about 23 percent by weight to about 43 percent by weight of at least one form of aluminum oxide (i.e., alumina—$Al_2O_3$), whether anhydrous or hydrated, from about 18 percent by weight to about 38 percent by weight of calcium fluoride ($CaF_2$), and from about 1 percent by weight to about 11 percent by weight of sodium hexafluoroaluminate (i.e., cryolite—$Na_3AlF_6$). Although the total amount of each component and/or optional component of component (B2a) may individually total more than 100 weight percent when each component is taken individually and totaled using the broadest amounts disclosed herein, one of skill in the art will realize that this is not the case. Rather, each individual component of component (B2a) can be varied within any stated range as desired in order to achieve a total weight percent of 100.

In another embodiment, component (B2a) is formed from about 25 percent by weight to about 41 percent by weight of silicon dioxide (i.e., silica—$SiO_2$), from about 27 percent by weight to about 39 percent by weight of silicon dioxide (i.e., silica—$SiO_2$), from about 29 percent by weight to about 37 percent by weight of silicon dioxide (i.e., silica—$SiO_2$), from about 31 percent by weight to about 35 percent by weight of silicon dioxide (i.e., silica—$SiO_2$), or even about 33 percent by weight of silicon dioxide (i.e., silica—$SiO_2$). Here, as well as elsewhere in the specification and claims, individual range values can be combined to form additional and/or non-disclosed ranges.

In another embodiment, component (B2a) is formed from about 25 percent by weight to about 41 percent by weight of at least one form of aluminum oxide (i.e., alumina—$Al_2O_3$), from about 27 percent by weight to about 39 percent by weight of at least one form of aluminum oxide (i.e., alumina—$Al_2O_3$), from about 29 percent by weight to about 37 percent by weight of at least one form of aluminum oxide (i.e., alumina—$Al_2O_3$), from about 31 percent by weight to about 35 percent by weight of at least one form of aluminum oxide (i.e., alumina—$Al_2O_3$), or even about 33 percent by weight of at least one form of aluminum oxide (i.e., alumina—$Al_2O_3$). Here, as well as elsewhere in the specification and claims, individual range values can be combined to form additional and/or non-disclosed ranges.

In another embodiment, component (B2a) is formed from about 20 percent by weight to about 36 percent by weight of calcium fluoride ($CaF_2$), from about 22 percent by weight to about 34 percent by weight of calcium fluoride ($CaF_2$), from about 24 percent by weight to about 32 percent by weight of calcium fluoride ($CaF_2$), from about 26 percent by weight to about 30 percent by weight of calcium fluoride ($CaF_2$), or even about 28 percent by weight of calcium fluoride ($CaF_2$). Here, as well as elsewhere in the specification and claims, individual range values can be combined to form additional and/or non-disclosed ranges.

In another embodiment, component (B2a) is formed from about 2 percent by weight to about 10 percent by weight of sodium hexafluoroaluminate (i.e., cryolite—$Na_3AlF_6$), from about 3 percent by weight to about 9 percent by weight of sodium hexafluoroaluminate (i.e., cryolite—$Na_3AlF_6$), from about 4 percent by weight to about 8 percent by weight of sodium hexafluoroaluminate (i.e., cryolite—$Na_3AlF_6$), from about 5 percent by weight to about 7 percent by weight of sodium hexafluoroaluminate (i.e., cryolite—$Na_3AlF_6$), or even about 6 percent by weight sodium hexafluoroaluminate (i.e., cryolite—$Na_3AlF_6$). Here, as well as elsewhere in the specification and claims, individual range values can be combined to form additional and/or non-disclosed ranges.

Given the above, once suitable amounts of the various four components of component (B2a) are selected, all four powders are mixed homogeneously prior to vitrification. Since the four components for the formation of component (B2a) contain silicon dioxide (i.e., silica) and aluminum oxide (i.e., alumina), a crucible formed from either of these materials are compatible for mixing the materials prior to the vitrification thereof. The use of a suitable crucible formed from a suitable material as detailed herein assures that there will be no serious contamination issue with the powders used to form component (B2a) prior to vitrification. Thus, it is important to avoid contamination via any metal, metal oxide, or metal alloy (e.g., iron and/or steel) in the powder mixture that is going to be vitrified to form component (B2a) of Part (B2). While not wishing to be bound to any one theory, it is believed that any metals, metal oxides, or metal alloys will interfere with the subsequent chemical processes used for production of final coating products.

Next, vitrification is conducted on the aforementioned mixture of four powdered components at a temperature of at least about 1300° C. for a period of at least about three hours. Higher vitrification temperatures can be used if required for complete vitrification of the powder. Thus, in one embodiment, the vitrification temperature can be at least about 1350° C., at least about 1400° C., at least about 1450° C., at least about 1500° C., at least about 1550° C., at least about 1600° C., at least about 1650° C., at least about 1700° C., at least about 1750° C., at least about 1800° C., at least about 1850° C., at least about 1900° C., at least about 1950° C., or even at least about 2000° C. In one embodiment, vitrification is conducted at any suitable temperature as detailed above for at least about 3.5 hours, at least about 4 hours, at least about 4.5 hours, at least about 5 hours, at least about 5.5 hours, or even at least about 6 hours. Here, as well as elsewhere in the specification and claims, individual range values can be combined to form additional and/or non-disclosed ranges.

After vitrification the resulting melt is subjected to normal cooling procedures by setting aside the vitrified mixture and allowing same to gradually and naturally cool to room temperature. This is accomplished by taking the glass melt out of a kiln and pouring same onto a bed of silica material. No special steps need be taken to avoid any fracture resulting from shock cooling, as the vitrified glass material is subsequently be ground to very fine powder per the procedure below.

Pulverization of the vitrified product to yield component (B2a) for use in Part (B2) is accomplished using a mortar and pestle, or some other suitable equipment, until the particle of the ground up vitrified material is as follows: average particle size is about 10 µm, at least about 75 percent by weight of the particles have a particle size of less than about 5 µm, all of the ground up vitrified particles have a particle size of less than about 15 µm, and the surface area of any given particle is on average about 0.87 µm$^{-1}$.

Regarding component (B2b), component (B2b) is formed from one or more metal oxide powders selected from one or more aluminum oxide powders, one or more zinc oxide powders, one or more iron oxide powders, one or more titanium oxide powders, one or more magnesium oxide powders, one or more copper oxide powders, one or more manganese oxide powders, one or more or calcium oxide powders, or any mixture of two or more thereof, or any mixture of three or more thereof, or any mixture of four or more thereof, or even any mixture of five or more thereof. In still another embodiment, component (B2b) is formed from a mixture of one or more zinc oxide powders. In this embodiment, any of the additional metal oxide compounds listed above can optionally be added as additional compounds at similar amounts as specified below for the rheology modifiers and/or the one or more lignin compounds.

Thus, as can be seen from the components of Part (B2) above, in one embodiment Part (B2) is an inorganic composition formed from components (B2a), (B2b) and (B2c), where Part (B2) has less than about 7.5 percent by weight carbon and/or other organic compounds, has less than about 5 percent by weight carbon and/or other organic compounds, has less than about 2.5 percent by weight carbon and/or other organic compounds, has less than about 1 percent by weight carbon and/or other organic compounds, has less than about 0.5 percent by weight carbon and/or other organic compounds, has less than about 0.1 percent by weight carbon and/or other organic compounds, or is even free of (that is has zero percent by weight) carbon and/or other organic compounds. Here, as well as elsewhere in the specification and claims, individual range values can be combined to form additional and/or non-disclosed ranges.

In still another embodiment, Part (B2) can further optionally include one or more colorants, one or more anti-settling compounds (e.g., thixotropic agents), one or more viscosity modifiers, one or more thickeners (e.g., xanthan gum), one or more rheology modifiers, one or more pigments (e.g., TiO$_2$), one or more lignin compounds such as a calcium lignosulphonate (e.g., Norlig A from Borregaard LignoTech a binder for pan-granulation, seed coatings, extruded and/or spray-dried granules), one or more fibers, one or more milled glass fibers (e.g., fiberglass fibers, etc.), one or more kaolin-bearing compounds, one or more types and/or concentrations of boric acid (e.g., H$_3$BO$_3$), or mixtures of any two or more, three or more, four or more, or even five or more thereof. Some of these additional additives may be organic in nature. Such additives are utilized to impart various desired properties to the mixture that forms the basis of Part (B2) of the present invention and permits Part (B2) to have improved shelf-life, improved rheological properties, improved mixability and/or sprayability, improved coating strength, etc.

As used herein, the terms "-bearing compound(s)" and "-containing compound(s)" are used interchangeably. For example, the terms "kaolin-bearing compound" and "kaolin-containing compound" are to be construed as the same and as noted above are utilized interchangeably. As would be apparent, this distinction applies equally to all terms that utilize the same constructs noted herein. In one embodiment, the kaolin-bearing compound(s) of the present invention is/are any kaolin-containing compound (e.g., kaolinite which is a mineral that is contained in kaolin clays and which has a chemical composition of Al$_2$Si$_2$O$_5$(OH)$_4$). Accordingly, as used herein, "kaolin" is defined to mean, and encompass, any clay that contains a sufficient amount of kaolin therein (e.g., any clay that is at least 50 weight percent kaolin), or any clay or other compound that contains a sufficient amount of the mineral kaolinite (Al$_2$Si$_2$O$_5$(OH)$_4$) (e.g., any clay, or other compound, that is at least 50 weight percent kaolinite).

In the case where such one or more organic-based additives, or even one or more lignin compounds, are added to Part (B2), Part (B2) will include a minor amount of organic material. By minor amount it is meant that Part (B2) will have less than about 7.5 percent by weight carbon and/or other organic compounds, will have less than about 7 percent by weight carbon and/or other organic compounds, will have less than about 6.5 percent by weight carbon and/or other organic compounds, will have less than about 6 percent by weight carbon and/or other organic compounds, will have less than about 5.5 percent by weight carbon and/or other organic compounds, will have less than about 5 percent by weight carbon and/or other organic compounds, will have less than about 4.5 percent by weight carbon and/or other organic compounds, will have less than about 4 percent by weight carbon and/or other organic compounds, will have less than about 3.5 percent by weight carbon and/or other organic compounds, will have less than about 3. percent by weight carbon and/or other organic compounds, will have less than about 2.5 percent by weight carbon and/or other organic compounds, will have less than about 1 percent by weight carbon and/or other organic compounds, or will even have less than about 0.5 percent by weight carbon and/or other organic compounds. Here, as well as elsewhere in the specification and claims, individual range values can be combined to form additional and/or non-disclosed ranges.

Given the above, Part (B2) is formed from about 12 percent by weight to about 32 percent by weight component (B2a), from about 30 percent by weight to about 50 percent by weight component (B2b) and from about 25 percent by weight to about 45 percent by weight component (B2c). Optionally, Part (B2) can further include one or more colorants, one or more anti-settling compounds (e.g., thixotropic agents), one or more viscosity modifiers, one or more thickeners (e.g., xanthan gum), one or more rheology modifiers, one or more pigments (e.g., TiO$_2$), one or more lignin compounds such as a calcium lignosulphonate (e.g., Norlig A from Borregaard LignoTech a binder for pan-granulation, seed coatings, extruded and/or spray-dried granules), one or more fibers, one or more milled glass fibers (e.g., fiberglass fibers, etc.), one or more kaolin-bearing compounds, one or more types and/or concentrations of boric acid (e.g., H₃BO₃), or mixtures of any two or more, three or more, four or more, or even five or more thereof are present in total, or even individually, at a range of about 0.1 percent by weight to about 3 percent by weight. In one particular embodiment, Part (B2) further includes one or more additional additives such as one or more additional additives such as one or more clay-based rheology modifiers (e.g., one or more clay-based rheology modifiers such as Attagel® a phyllosilicate clay rheology modifier from BASF) at a range of about 0.1 percent by weight to about 2.5 percent by weight, the one or more lignin compounds such as a calcium lignosulphonate at a range of about 0.1 percent by weight to about 2.5 percent, the one or more milled glass fibers such as fiberglass fibers at a range of about 0.1 percent by weight to about 5 percent and/or the one or more kaolin compounds or kaolin-bearing compounds at a range of about 0.1 percent by weight to about 5 percent by weight. Although the total amount of each component and/or optional component of Part (B2) may individually total more than 100 weight percent when each component is taken individually and totaled using the broadest amounts disclosed herein, one of skill in the art will realize that this is not the case. Rather, each individual component of Part (B2) can be varied within any stated range as desired in order to achieve a total weight percent of 100.

In another embodiment, Part (B2) is formed from about 14 percent by weight to about 30 percent by weight component (B2a), from about 16 percent by weight to about 28 percent by weight component (B2a), from about 18 percent by weight to about 26 percent by weight component (B2a), from about 20 percent by weight to about 24 percent by weight component (B2a), or even about 22 percent by weight component (B2a). Here, as well as elsewhere in the specification and claims, individual range values can be combined to form additional and/or non-disclosed ranges.

In another embodiment, Part (B2) is formed from about 32 percent by weight to about 48 percent by weight component (B2b), from about 34 percent by weight to about 46 percent by weight component (B2b), from about 36 percent by weight to about 44 percent by weight component (B2b), from about 38 percent by weight to about 42 percent by weight component (B2b), or even about 40 percent by weight component (B2b). Here, as well as elsewhere in the specification and claims, individual range values can be combined to form additional and/or non-disclosed ranges.

In another embodiment, Part (B2) is formed from about 27 percent by weight to about 43 percent by weight component (B2c), from about 29 percent by weight to about 41 percent by weight component (B2c), from about 31 percent by weight to about 39 percent by weight component (B2c), from about 33 percent by weight to about 37 percent by weight component (B2c), or even about 35 percent by weight component (B2c). Here, as well as elsewhere in the specification and claims, individual range values can be combined to form additional and/or non-disclosed ranges.

If present, in another embodiment the one or more colorants, one or more anti-settling compounds (e.g., thixotropic agents), one or more viscosity modifiers, one or more thickeners (e.g., xanthan gum), one or more rheology modifiers, one or more pigments (e.g., TiO₂), one or more lignin compounds such as a calcium lignosulphonate (e.g., Norlig A from Borregaard LignoTech a binder for pan-granulation, seed coatings, extruded and/or spray-dried granules), one or more fibers, one or more milled glass fibers (e.g., fiberglass fibers, etc.), one or more kaolin-bearing compounds, one or more types and/or concentrations of boric acid (e.g., H₃BO₃), or mixtures of any two or more, three or more, four or more, or even five or more thereof are present in total, or even individually, at a range of about 0.25 percent by weight to about 2.75 percent by weight, about 0.5 percent by weight to about 2.5 percent by weight, about 0.75 percent by weight to about 2.25 percent by weight, about 1 percent by weight to about 2 percent by weight, about 1.25 percent by weight to about 1.75 percent by weight, or even at about 1.5 percent by weight. Here, as well as elsewhere in the specification and claims, individual range values can be combined to form additional and/or non-disclosed ranges. If present, in another embodiment the one or more additional additives such as the one or more clay-based rheology modifiers (e.g., one or more clay-based rheology modifiers such as Attagel® a phyllosilicate clay rheology modifier from BASF) are present at a range of about 0.3 percent by weight to about 2.3 percent by weight, about 0.5 percent by weight to about 2.1 percent by weight, about 0.7 percent by weight to about 1.9 percent by weight, about 0.9 percent by weight to about 1.7 percent by weight, about 1.1 percent by weight to about 1.5 percent by weight, or even at about 1.3 percent by weight. Here, as well as elsewhere in the specification and claims, individual range values can be combined to form additional and/or non-disclosed ranges. If present, in another embodiment the one or more additional additives such as the one or more lignin compounds such as a calcium lignosulphonate are present at a range of about 0.3 percent by weight to about 2.3 percent by weight, about 0.5 percent by weight to about 2.1 percent by weight, about 0.7 percent by weight to about 1.9 percent by weight, about 0.9 percent by weight to about 1.7 percent by weight, about 1.1 percent by weight to about 1.5 percent by weight, or even at about 1.3 percent by weight. Here, as well as elsewhere in the specification and claims, individual range values can be combined to form additional and/or non-disclosed ranges.

If present, the one or more additional additives such as the one or more milled glass fibers such as fiberglass fibers are present at a range of about 0.3 percent by weight to about 4.8 percent by weight, about 0.5 percent by weight to about 4.6 percent by weight, about 0.7 percent by weight to about 4.4 percent by weight, about 0.9 percent by weight to about 4.2 percent by weight, about 1.1 percent by weight to about 4 percent by weight, about 1.3 percent by weight to about 3.8 percent by weight, about 1.5 percent by weight to about 3.6 percent by weight, about 1.7 percent by weight to about 3.4 percent by weight, about 1.9 percent by weight to about 3.2 percent by weight, about 2.1 percent by weight to about 3 percent by weight, about 2.3 percent by weight to about 2.8 percent by weight, or even at about 2.5 percent by weight. Here, as well as elsewhere in the specification and claims, individual range values can be combined to form additional and/or non-disclosed ranges. If present, the one or more additional additives such as the one or more kaolin compounds or kaolin-bearing compounds are present at a range of about 0.3 percent by weight to about 4.8 percent by weight, about 0.5 percent by weight to about 4.6 percent by weight, about 0.7 percent by weight to about 4.4 percent by weight, about 0.9 percent by weight to about 4.2 percent by weight, about 1.1 percent by weight to about 4 percent by weight, about 1.3 percent by weight to about 3.8 percent by weight, about 1.5 percent by weight to about 3.6 percent by weight, about 1.7 percent by weight to about 3.4 percent by weight, about 1.9 percent by weight to about 3.2 percent by weight, about 2.1 percent by weight to about 3 percent by weight, about 2.3 percent by weight to about 2.8 percent by weight, or even at about 2.5 percent by weight. Here, as well as elsewhere in the specification and claims, individual range values can be combined to form additional and/or non-disclosed ranges.

In one embodiment, Part (B2) is formed by the following procedure: Step (i) measure 5.43 pounds of water in a suitable container or bucket (component (B2c)—tap water or any other suitable type of water such as distilled water will suffice), Step (ii) pour the desired amount of water into a suitably sized mixer and start the mixer; Step (iii) as the mixer is mixing, slowly add 3.41 pounds of component (B2a) and continue to mix; Step (iv) as the water/component (B2a) mixture is mixing slowly add 6.2 pounds of component (B2b) (in this case it is zinc oxide powder but can be other meal oxide powders as noted above), continue to mix the resulting mixture slowly; and Step (v) add 0.23 pounds of each of the optional additives (i.e., the milled fibers and the kaolin) one by one and mix until one obtains a homogeneous paste.

As would be apparent to those of skill in the art, while various specific amounts of the various components used to produce Part (B2), these amounts are exemplary in nature and can be modified accordingly to produce a larger, or even smaller, amount of Part (B2).

Preparation of Inventive Coatings

The coatings are of the present invention are produced by a chemical reaction (typically an acid-base reaction) between one or more of Part (A1) and/or Part (A2) with one or more of Part (B1) and/or Part (B2). In one embodiment, the inventive coatings are formed from two pastes, one acidic (Part (A1) or Part (A2)) and the other being alkaline, or even neutral in pH (Part (B1) or Part (B2)). The acidic paste (Part (A1) or Part (A2)) acts as the activator via the phosphoric acid, polyphosphoric acid or acid phosphate contained therein and whose pH is adjusted to activate the alkaline, or neutral, paste (Part (B1) or Part (B2)). In the present invention, as noted above, the alkaline paste (Part (B1) or Part (B2)) can instead be formed to be neutral and contains the above noted silica glass component.

In another embodiment, the silicon dioxide components of Part (B1a) and/or Part (B2a) can be replaced or supplemented with one or more calcium oxide powders (CaO), one or more aluminum powders ($Al_2O_3$) and/or boron oxide powder ($B_2O_3$) at the same weight percentages discussed above for components (B1a) and (B2a). In still another embodiment, one can use one or more amorphous silica materials to augment the components (B1a) and (B2a) while still adhering to the weight percentages discussed above for components (B1a) and (B2a). In still yet another embodiment, fumed silica and/or clean fly ash maybe used to augment the components (B1a) and (B2a) while still adhering to the weight percentages discussed above for components (B1a) and (B2a).

The coatings of the present invention (that is a combination of Part (A1) or Part (A2) with one of Part (B1) or Part (B2)) can be applied using spray guns, brush or rollers to produce thin films on metals, on inorganic surfaces such as cement or concrete, or on a wood surface. On metal and concrete, the coatings of the present invention form a chemical bond thereto due to one or more chemical reactions occurring between the application of a mixture of one or more of Part (A1) and/or Part (A2) with one or more of Part (B1) and/or Part (B2). The layer formed by this chemical bond is responsible for corrosion protection and can be referred to as a passivation layer. This passivation layer can be further protected from external abrasion, impact and other stresses by a protective layer, which can be referred to as top layer. Thus, in one embodiment, no heat-based curing step is required to achieve a coating in accordance with the present invention.

Both layers can be formed in a single spray of the coatings of the present invention and, thus, no second coat is needed unless one desires to build up a thickness beyond about 250 micrometers to about 500 micrometers (about 10 mils to about 20 mils) to exploit other properties such as superior insulation, longer chemical protection or esthetic surface formations. It should be noted that the present invention is not limited to solely coating thickness of only about 250 micrometers to about 500 micrometers. Rather, any suitable coating thickness of at least about 25 micrometers, at least about 50 micrometers, at least about 75 micrometers, at least about 100 micrometers, at least about 125 micrometers, at least about 150 micrometers, at least about 175 micrometers, at least about 200 micrometers, at least about 225 micrometers, at least about 250 micrometers, at least about 275 micrometers, at least about 300 micrometers, at least about 325 micrometers, at least about 350 micrometers, at least about 375 micrometers, at least about 400 micrometers, at least about 425 micrometers, at least about 450 micrometers, at least about 475 micrometers, at least about 500 micrometers, at least about 525 micrometers, at least about 550 micrometers, at least about 575 micrometers, at least about 600 micrometers, at least about 625 micrometers, at least about 650 micrometers, at least about 675 micrometers, at least about 700 micrometers, at least about 725 micrometers, at least about 750 micrometers, at least about 775 micrometers, at least about 800 micrometers, at least about 825 micrometers, at least about 850 micrometers, at least about 875 micrometers, at least about 900 micrometers, at least about 925 micrometers, at least about 950 micrometers, at least about 975 micrometers, at least about 1000 micrometers, at least about 1500 micrometers, at least about 2000 micrometers, at least about 2500 micrometers, at least about 3000 micrometers, at least about 3500 micrometers, at least about 4000 micrometers, at least about 4500 micrometers, at least about 5000 micrometers, at least about 5500 micrometers, at least about 6000 micrometers, at least about 6500 micrometers, at least about 7000 micrometers, at least about 7500 micrometers, at least about 8000 micrometers, at least about 8500 micrometers, at least about 9000 micrometers, at least about 9500 micrometers, at least about 10000 micrometers, at least about 10500 micrometers, at least about 11000 micrometers, at least about 11500 micrometers, at least about 12000 micrometers, or even at least about 12500 micrometers (i.e., about 0.5 inches or 500 mils) can be achieved by applying one or more layers of any of the coatings disclosed herein. Here, as well as elsewhere in the specification and claims, individual range values can be combined to form additional and/or non-disclosed ranges.

The bond between the coatings of the present invention and wood tend to be only physical. While part of the applied mixed coating paste is absorbed into the pores of a wood surface, it then sets and holds the coating on the surface of wood by a physical bond and thus the absorbed coating layer acts like an anchor to the wood surface for the remainder of the coating layer. Thus, in one embodiment, no heat-based curing step is required to achieve a wood-coated article in accordance with the present invention.

The passivation layer on metals performs an important function of providing corrosion protection to a metal substrate. Especially in the case of steel, where corrosion is a major issue, the passivation layer reacts with iron (Fe) and forms an iron phosphate compound comprising strengite (i.e., $FePO_4 \cdot 2H_2O$) which is considered to be a very stable corrosion protective compound. Thus, this passivation layer comprises a layer of tough phospho-silicate-aluminate glassy minerals which make the structure of the passivation layer tough, water impermeable and dense. Therefore, this passivation layer is very stable in a wide range of chemical environments including saline, acidic, alkaline and/or marine.

The presence and toughness of the passivation layer distinguishes the coatings of the present invention from other commercially available coatings. For example, most polymer emulsion-based coatings are simply a physical coating and do not have a passivation layer/effect. Available powder coatings also do not contribute to corrosion protection other than as physical barriers to a corroding environment. When breached, all of these coatings become vulnerable to environmental degradation of the entire coating by atmospheric blistering. On the other hand, the coatings produced via the present invention, even when a topcoat thereof is breached, do not expose the underlying metal substrate to external exposure since the passivation layer itself is very tough and cannot easily be breached.

Passivation layers can be formed by applying a primer, such as phosphoric acid, or one or more oxide-based chemically-bonded phosphate ceramics available in the market. However, all of these materials require a second coat that is polymeric in nature and which needs to be applied after the first coat is cured. This necessitates a second round of application. The coatings of the present invention permit one to obtain a desired coating in a single spray application which produces both a passivation layer as well as a protective coating/layer.

In one embodiment, the coatings of the present invention are pore-free, dense, slightly flexible ceramic coatings with a glass-crystalline structure. They provide protection to a desired coated surface from external deterioration mechanisms of impact, abrasion, fire, and chemical and biological attacks.

In one embodiment, the coatings of the present invention are applied by mixing one of Part (A1) or Part (A2) with one of Part (B1) or Part (B2) so that the desired chemical reaction between the two parts is initiated. In one instance, this is done by using a plural pump system, in which two separate pumps force one of Part (A1) or Part (A2) together with one of Part (B1) or Part (B2) into a static mixer, which mixes the two components and the desired chemical reaction is initiated in the parts. The reacting material is then sprayed under pressure onto a desired substrate. This method mimics that of a two-part epoxy system and hence a similar plural pumping system can be utilized.

The coatings of the present invention are formed when the mixture of one or more of Part (A1) and/or Part (A2) together with one or more of Part (B1) and/or Part (B2) is activated by the acidic medium of the one or more phosphate-containing compounds of either Part (A1) and/or (Part (A2). When Part (A1) and/or Part (A2) are mixed together with one of Part (B1) and/or Part (B2), they react and form silicate, aluminate, and aluminosilicate mineral complexes that are partially in glassy phases. The resulting structures are very similar to many of the natural phosphate minerals, such as apatite and man-made glass ceramics. The difference, however, is that nature produces these minerals at high temperature without using water, while the present invention discloses a similar material formed at room temperature in an aqueous medium by acid-base reaction of the disclosed materials.

In one embodiment, the flexural strength of the coatings of the present invention can be enhanced by adding fine whiskers of glass or minerals, such as wollastonite ($CaSiO_3$) to Part (B1) and/or Part (B2). One can also optionally cellulosic fibers also if these coatings are not designed for high temperature applications (typically these are also added to Part (B1) and/or Part (B2)). Some of these additives will react sparsely with the one or more phosphate-containing compounds of Part (A1) and/or Part (A2) and form their own bond, and some will be totally unreactive. Either way they enhance the flexural strength and elastic modulus of the coatings of the present invention.

The toughness of the coatings of the present invention can be enhanced by the optional addition of one or more hard particles and/or particles in platelet structures, such as fine-grained sand or kaolinite, which is in platelet form, in Part (B1) and/or Part (B2). Other optional additives are clay, calcined alumina ($Al_2O_3$), titanium dioxide ($TiO_2$), zirconia ($ZrO_2$), etc. Inclusion of any particles that are unreactive in the acid-base reaction and exhibit extreme hardness will also serve this purpose.

The heat reflectivity of the coatings of the present invention can be enhanced for heat related applications by the optional addition of one or more heat reflecting minerals such as rutile or magnesia which can be added to Part (B1) and/or Part (B2). These materials have a very high heat reflectivity (from about 90 percent to about 99.9 percent) and they enhance the heat reflectivity of the coatings of the present invention, which helps to keep the coated substrate cooler.

In place of heat reflectivity, if more heat transfer is needed through the coatings of the present invention, one may add heat absorptive minerals in the form of powders to any of Part (A1), Part (A2), Part (B1) and/or Part (B2) selected from black iron oxide (magnetite, $Fe_3O_4$), one or more iron oxides (e.g., wustite—FeO), lamp and/or carbon black and/or one or more manganese oxides (MnO and/or $Mn_3O_4$).

In the inventive coatings of the present invention the above materials can be added at a loading level of between about 0.1 percent by weight to about 25 percent by weight can be achieved without the loss of other favorable properties, and ideally at a level of about 10 percent by weight, to any of Part (A1), Part (A2), Part (B1) and/or Part (B2) after these parts of the coatings of the present invention are formed per the disclosure detailed above. Examples of optional additives are MgO, FeO, $Fe_3O_4$, and $Mn_3O_4$.

As noted above, any of Parts (A1), (A2), (B1) and/or (B2) can further optionally include one or more additional additives such as one or more colorants, one or more anti-settling compounds (e.g., thixotropic agents), one or more viscosity modifiers, one or more thickeners (e.g., xanthan gum), one or more rheology modifiers, one or more pigments (e.g., $TiO_2$), one or more lignin compounds such as a calcium lignosulphonate (e.g., Norlig A from Borregaard LignoTech a binder for pan-granulation, seed coatings, extruded and/or spray-dried granules), one or more fibers, one or more milled glass fibers (e.g., fiberglass fibers, etc.), one or more kaolin-bearing compounds, or mixtures of any two or more, three or more, four or more, or even five or more thereof at the various amounts detailed above. Some of these additional additives as noted above may be organic in nature.

In the case of the one or more viscosity modifiers, one or more thickeners and/or one or more rheology modifiers—any types of such compounds can be used in any one or more of Parts (A1), (A2), (B1) and/or (B2) at the various amounts detailed above. Some examples of various types of one or more viscosity modifiers, one or more thickeners and/or one or more rheology modifiers include, but are not limited to, alkali swellable emulsions (ASEs), hydrophobically-modified alkali swellable emulsions (HASEs), hydrophobically-modified ethoxylated urethane resins (HEURs), hydroxyethyl celluloses (HECs), nonionic synthetic associative thickeners (NSATs), one or more polysaccharides (e.g., xanthan gum), etc. There are many other types of viscosity modifiers, thickeners and/or rheology modifiers available such as multifunctional polymers, copolymers of acrylic acid, N-vinylpyrrolidone, cationic monomers (e.g., N-vinylimidazole) and hydrophobic monomers such as a long-chain ester of methacrylic acid having an ethoxylated spacer chain, preferably PEG-25 methacrylate that may be of use in connection with the compositions of the present invention. As such, the one or more viscosity modifiers, one or more thickeners and/or one or more rheology modifiers of the present invention are not to be construed as limited to just any one specific type of compound, or even one specific chemical compound, rather any number of any one or more viscosity modifiers, any one or more thickeners and/or any one or more rheology modifiers disclosed herein can be utilized in the various embodiments of the present invention.

Another feature that makes the coatings of the present invention unique is that the coatings of the present invention are stable at high temperatures, even up to about 900° C. The coatings of the present invention are heat reflective, in combination with the thermal stability, and thus this makes the coatings of the present invention useful in unique applications such as for coating the interior of furnaces, high pressure steam pipes, hot fluid transport pipes, etc., where polymeric paints cannot be used.

As noted above, the coatings of the present invention can optionally contain a very small amount of copper oxide, or even any other anti-bacterial compound, in either Part (B1) and/or Part (OB2) so as to yield coatings with anti-fungal properties In one embodiment, the coatings of the present invention are typically white or beige once applied and set. However, should one desire, one can optionally add any suitable pigment and/or coloring agent, or even one or more suitable oxide- or silicate-based pigments. Using these materials, a wide range of colors with different shades can be produced.

The coatings of the present invention have numerous applications and can also be produced in various solid forms. Such solid forms can be used as quick-setting binders, which are mixed with various aggregates and fillers and tailored to suitable applications such as rapid-setting grouts.

Alternatively, the material of the present invention when mixed from one of Part (A1) or Part (A2) together with one of Part (B1) or Part (B2) can be, as noted above, used to produce a rapid-setting grout and/or concrete. Adding a binder such as sand, gravel, any suitable type of aggregate, waste materials such as fly ash, bottom ash, construction industry solid waste, solid mine tailings, byproduct waste streams such as leached out red mud from alumina industry in large proportions, etc. at a loading of about 15 percent by weight to about 60 percent by weight permits one to produce a rapid-setting grout that can be used as concrete, an injectable sealer for civil engineering applications and/or as a construction material. Due to the dense structure of the present invention's mixture it acts as a binder material and the resulting products can be made water impermeable. Because of the durability of the present invention's binder in high temperature, the resulting products will also be of refractory nature.

The acid-base reaction that occurs in the coating of the present invention occurs, in one instance, between a phosphate anion (negative ion) and an aluminosilicate cations (positive ions), thereby forming an alumino-silico-phosphate coating product.

Other optional components form Part (B1) and/or Part (B2) include, but are not limited to, unreactive silicates (such as sand), metals or metal oxides (e.g., titanium and/or a titanium oxide), aluminosilicates (marble and granite powder, silicate fibers and whiskers).

In one embodiment, a coating in accordance with the present invention is produced by mixing one or more of Part (A1) and/or Part (A2) with one or more of Part (B1) and/or Part (B2) at a ratio of Part (A1)/(A2) to Part (B1)/(B2) of about 1:0.5 to about 1:3, from about 1:0.75 to about 1:2.75, or even from about 1:1 to about 1:2.5. In one instance a first initial thin layer of the coating of the present invention is sprayed onto a desired surface, say a layer having a thickness of about 1 mil to about 5 mils, then after 10 minutes another layer of the desired coating of the present invention is sprayed at a thickness of about 15 mils. Thereafter an additional amount of coating material can be applied at any desired thickness. As noted above, the coating of the present invention reacts with the substrate being sprayed and hardens into a hard coat with a thin passivation layer and a thick top protective coat within one hour.

Ideally, the spray equipment including the spray gun are washed immediately after the job is done so that the mix of one of Part (A1) or Part (A2) with one of Part (B1) or Part (B2) do not react in the tubes and spray gun and block them for the next use. To make the mixture of the present invention pumpable, any particles in any one or more of Part (A1), Part (A2), Part (B1) and/or Part (B2) need to be as fine as possible. The practical range is nano-particles of about 45 microns (i.e., particles passing through a 325 number sieve). Ideally, any particles used in any of Part (A1), Part (A2), Part (B1) and/or Part (B2) are spherical and or nearly spherical in shape.

EXAMPLE FORMULATIONS

The following are exemplary formulations for various embodiments of Parts (A1), (A2), (B1) and/or (B2). It should be noted that these formulations and the various numerical amounts disclosed therein are to be construed as non-limiting in nature and that the present invention encompasses any formulation of Parts (A1), (A2), (B1) and/or (B2) that fall within any of the ranges disclosed in this specification.

Part (A1)—Example 1

In this Example the following components are mixed together in accordance with the procedure discussed above to yield a composition in accordance with Part (A1) described above: 67.7 weight percent $KH_2PO_4$ (component (A1a)); 3.2 weight percent $H_3PO_4$ (component (A1b)—concentration is 85 percent by weight); 27.1 weight percent water (component (A1c)); 1 weight percent of an optional rheology modifier (Attagel); and 1 weight percent of an optional lignin (Norlig A).

Part (A1)—Example 2

In this Example the following components are mixed together in accordance with the procedure discussed above to yield a composition in accordance with Part (A1) described above: 69.5 weight percent $KH_2PO_4$ (component (A1a)); 3.3 weight percent $H_3PO_4$ (component (A1b)— concentration is 85 percent by weight); and 27.2 weight percent water (component (A1c)).

Part (A1)—Example 3

In this Example the following components are mixed together in accordance with the procedure discussed above to yield a composition in accordance with Part (A1) described above: 68.5 weight percent $KH_2PO_4$ (component (A1a)); 3.3 weight percent $H_3PO_4$ (component (A1b)—concentration is 85 percent by weight); and 28.2 weight percent water (component (A1c)).

Part (A2)—Example 1

In this Example the following components are mixed together in accordance with the procedure discussed above to yield a composition in accordance with Part (A2) described above: 3.7 weight percent of aluminum powder (component (A2a)); 7.7 weight percent of zinc powder (component (A2a)); 0.6 weight percent magnesium powder (component (A2a)); 54 weight percent $H_3PO_4$ (component (A2b)—concentration is 85 percent by weight); and 34 weight percent water (component (A2c)).

Part (B1)—Example 1

In this Example the following components are mixed together in accordance with the procedure discussed above to yield a composition in accordance with Part (B1) described above: 40 weight percent glass powder (component (B1a)); 22.1 weight percent MgO powder (component (B1b)); 33 weight percent water (component (B1c)); 1.225 weight percent of an optional fiber additive; 1.225 weight percent of an optional kaolin additive; 1.225 weight percent of an optional rheology modifier (Attagel); and 1.225 weight percent of an optional lignin (Norlig A).

Part (B1)—Example 2

In this Example the following components are mixed together in accordance with the procedure discussed above to yield a composition in accordance with Part (B1) described above: 42.3 weight percent glass powder (component (B1a)); 21.5 weight percent MgO powder (component (B1b)); 32.1 weight percent water (component (B1c)); 1.3 weight percent of an optional fiber additive; 1.3 weight percent of an optional kaolin additive; 0.5 weight percent boric acid; and 1 weight percent of an optional thickener additive (xanthan gum).

Part (B1)—Example 3

In this Example the following components are mixed together in accordance with the procedure discussed above to yield a composition in accordance with Part (B1) described above: 41.7 weight percent glass powder (component (B1a)); 21.2 weight percent MgO powder (component (B1b)); 33 weight percent water (component (B1c)); 1.3 weight percent of an optional fiber additive; 1.3 weight percent of an optional kaolin additive; 0.5 weight percent boric acid; and 1 weight percent of an optional thickener additive (xanthan gum).

Part (B2)—Example 1

In this Example the following components are mixed together in accordance with the procedure discussed above to yield a composition in accordance with Part (B2) described above: 22 weight percent glass powder (component (B2a)); 40 weight percent ZnO powder (component (B2b)); 35 weight percent water (component (B2c)); 1.5 weight percent of an optional fiber additive; and 1.5 weight percent of an optional kaolin additive.

The following is an exemplary formulation of component (B1a) and/or (B2a). It should be noted that this formulation and the various numerical amounts disclosed therein are to be construed as non-limiting in nature and that the present invention encompasses any formulation of components (B1a) and/or (B2a) that fall within any of the ranges disclosed in this specification.

Component (B1a)/(B2a)—Example 1

In this Example the following components are mixed together in accordance with the procedure discussed above to yield a composition in accordance with component (B1a) and/or (B2a) described above: 33 weight percent silicon dioxide powder; 33 weight percent $Al_2O_3$ powder; 28 weight percent $CaF_2$; and 6 weight percent $Na_3AlF_6$ powder.

While in accordance with the patent statutes the best mode and certain embodiments of the invention have been set forth, the scope of the invention is not limited thereto, but rather by the scope of the attached. As such, other variants within the spirit and scope of this invention are possible and will present themselves to those skilled in the art.

What is claimed is:

1. A silicate-based coating composition comprising:
Part (A), wherein Part (A) is an acidic phosphate-based material selected from Part (A1) or Part (A2); and
Part (B), wherein Part (B) is a glass powder/metal oxide mixture selected from Part (B1) or Part (B2),
wherein Part (A) is combined with Part (B) at a ratio of Part (A) to Part (B) of about 1:0.5 to about 1:3,
wherein Part A comprises:
(A2a) from about 5 percent by weight to about 17 percent by weight of at least one metal compound or metal oxide selected from one or more aluminum metal powders, one or more aluminum oxide powders, one or more zinc metal powders, one or more zinc oxide powders, one or more iron metal powders, one or more iron oxide powders, one or more titanium metal powders, one or more titanium oxide powders, one or more magnesium metal powders, one or more magnesium oxide powders, one or more copper metal powders, one or more copper oxide powders, one or more manganese metal powders, one or more manganese oxide powders, or mixtures of any two or more thereof;
(A2b) from about 44 percent by weight to about 64 percent by weight of phosphoric acid; and
(A2c) from about 24 percent by weight to about 44 percent by weight of water,
wherein Part (B1) comprises:
(B1a) from about 30 percent by weight to about 50 percent by weight of at least one silica-based glass powder;
(B1b) from about 12 percent by weight to about 32 percent by weight of at least one metal oxide; and
(B1c) from about 23 percent by weight to about 43 percent by weight of water, and
wherein Part (B2) comprises:
(B2a) from about 12 percent by weight to about 32 percent by weight of at least one silica-based glass powder;

(B2b) from about 30 percent by weight to about 50 percent by weight of at least one metal oxide; and
(B2c) from about 25 percent by weight to about 45 percent by weight of water.

2. The silicate-based coating composition of claim 1, wherein (A1a) is Part A includes one selected from one or more of monolithium phosphate ($LiH_2PO_4$), dilithium phosphate ($Li_2H PO_4$), monopotassium phosphate (KH2PO4), dipotassium phosphate ($K_2HPO_4$), monosodium phosphate ($NaH_2PO_4$), disodium phosphate ($Na_2HPO_4$), monosodium diphosphate ($NaH_3P_2O_7$), disodium diphosphate ($Na_2H_2P_2O_7$), trisodium diphosphate ($Na_3HP_2O_7$), tetrasodium diphosphate ($Na_4P_2O_7$), or mixtures of any two or more thereof.

3. The silicate-based coating composition of claim 1, wherein is Part A includes monolithium phosphate ($LiH_2PO_4$), monopotassium phosphate ($KH_2PO_4$), monosodium phosphate ($NaH_2PO_4$), or mixtures of any two or more thereof.

4. The silicate-based coating composition of claim 1, wherein Part A includes monopotassium phosphate ($KH_2PO_4$).

5. The silicate-based coating composition of claim 1, wherein Part A includes one selected from phosphoric acid ($H_3PO_4$), pyrophosphoric acid ($H_4P_2O_7$), tripolyphosphoric acid ($H_5P_3O_{10}$), tetrapolyphosphoric acid ($H_6P_4O_{13}$), trimetaphosphoric acid ($H_3P_3O_9$), phosphoric anhydride ($P_4O_{10}$), pyrophosphoric acid ($H_4P_2O_7$), or mixtures of any two or more thereof.

6. The silicate-based coating composition of claim 1, wherein Part A is formed from a combination of one or more aluminum metal powders and/or one or more aluminum oxide powders in combination with one or more zinc metal powders and/or one or more zinc oxide powders in further combination with one or more magnesium metal powders and/or one or more magnesium oxide powders.

7. The silicate-based coating composition of claim 1, wherein Part A has less than about 2.5 percent by weight carbon and/or other organic compounds.

8. A silicate-based coating composition comprising:
Part (A), wherein Part (A) is an acidic phosphate-based material selected from Part (A1) or Part (A2); and
Part (B), wherein Part (B) is a glass powder/metal oxide mixture selected from Part (B1) or Part (B2),
wherein Part (A) is combined with Part (B) at a ratio of Part (A) to Part (B) of about 1:0.5 to about 1:3,
wherein at least one of the following applies: (i) Part (A) comprises between 0.3 percent by weight and 2.3 percent by weight of one or more additives selected from one or more colorants, one or more anti-settling compounds, one or more rheology modifiers, one or more pigments, one or more lignin compounds, or mixtures of any two or more thereof, and (ii) Part B comprises between 0.3 percent by weight and 2.3 percent by weight of one or more rheology modifiers, one or more lignin compounds, or mixtures thereof,
wherein Part (A1) comprises:
  (A1a) from about 58 percent by weight to about 78 percent by weight of at least one alkali-acid phosphate;
  (A2b) from about 1 percent by weight to about 5 percent by weight of phosphoric acid;
  (A3c) from about 17 percent by weight to about 37 percent by weight of water, and
wherein Part (A2) comprises:
  (A2a) from about 5 percent by weight to about 17 percent by weight of at least one metal compound or metal oxide;
  (A2b) from about 44 percent by weight to about 64 percent by weight of phosphoric acid; and
  (A2c) from about 24 percent by weight to about 44 percent by weight of water,
wherein Part (B1) comprises:
  (B1a) from about 30 percent by weight to about 50 percent by weight of at least one silica-based glass powder;
  (B1b) from about 12 percent by weight to about 32 percent by weight of at least one metal oxide; and
  (B1c) from about 23 percent by weight to about 43 percent by weight of water, and
wherein Part (B2) comprises:
  (B2a) from about 12 percent by weight to about 32 percent by weight of at least one silica-based glass powder;
  (B2b) from about 30 percent by weight to about 50 percent by weight of at least one metal oxide; and
  (B2c) from about 25 percent by weight to about 45 percent by weight of water.

9. The silicate-based coating composition of claim 8, wherein Part A contains from about 0.3 percent by weight to about 2.3 percent by weight in total, or individually, of any of the one or more additional additives.

10. The silicate-based coating composition of claim 8, wherein Part A contains from about 0.3 percent by weight to about 2.3 percent by weight of one or more rheology modifiers.

11. The silicate-based coating composition of claim 8, wherein Part A contains from about 0.3 percent by weight to about 2.3 percent by weight of one or more lignin compounds.

12. The silicate-based coating composition of claim 8, wherein Part B contains one or more magnesium oxide powders.

13. The silicate-based coating composition of claim 8, wherein Part B contains one or more zinc oxide powders.

14. The silicate-based coating composition of claim 8, wherein Part B further comprises one or more additives selected from one or more colorants, one or more anti-settling compounds, one or more rheology modifiers, one or more pigments, one or more lignin compounds, one or more fibers, one or more milled glass fibers, one or more kaolin-bearing compounds, one or more types and/or concentrations of boric acid, or mixtures of any two or more thereof.

15. A silicate-based coating composition comprising:
Part (A), wherein Part (A) is an acidic phosphate-based material selected from Part (A1) or Part (A2); and
Part (B), wherein Part (B) is a glass powder/metal oxide mixture selected from Part (B1) or Part (B2) and also includes from about 0.1 percent by weight to about 5 percent by weight of one or more milled glass fibers and/or one or more kaolin-bearing compounds,
wherein Part (A) is combined with Part (B) at a ratio of Part (A) to Part (B) of about 1:0.5 to about 1:3,
wherein Part (A1) comprises:
  (A1a) from about 58 percent by weight to about 78 percent by weight of at least one alkali-acid phosphate;
  (A1b) from about 1 percent by weight to about 5 percent by weight of phosphoric acid;
  (A1c) from about 17 percent by weight to about 37 percent by weight of water, and
wherein Part (A2) comprises:

(A2a) from about 5 percent by weight to about 17 percent by weight of at least one metal compound or metal oxide;

(A2b) from about 44 percent by weight to about 64 percent by weight of phosphoric acid; and (A2c) from about 24 percent by weight to about 44 percent by weight of water, wherein Part (B1) comprises:

(B1a) from about 30 percent by weight to about 50 percent by weight of at least one silica-based glass powder;

(B1b) from about 12 percent by weight to about 32 percent by weight of at least one metal oxide; and (B1c) from about 23 percent by weight to about 43 percent by weight of water, and wherein Part (B2) comprises:

(B2a) from about 12 percent by weight to about 32 percent by weight of at least one silica-based glass powder;

(B2b) from about 30 percent by weight to about 50 percent by weight of at least one metal oxide; and (B2c) from about 25 percent by weight to about 45 percent by weight of water.

16. The silicate-based coating composition of claim 15, wherein Part B comprises from about 0.1 percent by weight to about 5 percent one or more kaolin-bearing compounds.

17. The silicate-based coating composition of claim 8, wherein Part B includes less than about 2.5 percent by weight carbon and/or other organic compounds.

18. The silicate-based coating composition of claim 15, wherein Part B contains from about 0.3 percent by weight to about 2.3 percent by weight of the one or more rheology modifiers.

19. The silicate-based coating composition of claim 15, wherein Part B contains from about 0.3 percent by weight to about 2.3 percent by weight of the one or more lignin compounds.

\* \* \* \* \*